United States Patent [19]
Takayama et al.

[11] Patent Number: 5,175,650
[45] Date of Patent: Dec. 29, 1992

[54] OBJECTIVE LENS SYSTEM FOR ENDOSCOPES

[75] Inventors: Toshikazu Takayama; Akira Hasegawa; Hiroyuki Fukuda, all of Tokyo, Japan

[73] Assignee: Olympus Optical Co., Ltd., Tokyo, Japan

[21] Appl. No.: 520,501

[22] Filed: May 8, 1990

[30] Foreign Application Priority Data

May 9, 1989 [JP] Japan .................................. 1-114068
Feb. 2, 1990 [JP] Japan .................................. 2-22222

[51] Int. Cl.⁵ .......................... G02B 13/18; G02B 5/20
[52] U.S. Cl. .................................. 359/716; 359/644; 359/645; 359/663; 359/714; 359/715; 359/723
[58] Field of Search ............... 350/432, 410, 450, 415, 350/439; 359/716, 644, 715, 663, 645, 723, 714

[56] References Cited

U.S. PATENT DOCUMENTS

| | | | |
|---|---|---|---|
| 4,806,001 | 2/1989 | Okabe et al. | 350/432 |
| 4,867,546 | 9/1989 | Nishioka et al. | 350/432 |
| 4,986,642 | 1/1991 | Yokota et al. | 350/439 |

FOREIGN PATENT DOCUMENTS 62-173415 7/1987 Japan .
63-26123 2/1988 Japan .

Primary Examiner—Scott J. Sugarman
Attorney, Agent, or Firm—Cushman, Darby & Cushman

[57] ABSTRACT

An objective optical system for endoscopes comprising, in the order from the object side, a front negative lens unit, an aperture stop, a positive lens unit comprising at least one positive lens component, and an infrared cut filter arranged immediately before said aperture stop, said objective optical system being adapted so as to allow rays to be incident on said filter at heights lower than the outside circumference of said filter.

13 Claims, 19 Drawing Sheets

OBJECTIVE LENS SYSTEM FOR ENDOSCOPES

BACKGROUND OF THE INVENTION

1. Field of the Invention

The present invention relates to an objective lens system for endoscopes.

2. Description of the Prior Art

As an objective lens system for endoscopes, there is known the lens system disclosed by Japanese Patent Kokai Publication No. Sho 62-173415. This objective lens system has defects that the lens system has a long total length, that the outside diameter of the lens system is large as compared with the diameter of an image formed thereby, and so on.

Further, as another conventional example of objective lens systems, there is also known the lens system disclosed by Japanese Patent Kokai Publication No. Sho 63-26123. This objective lens system has defects that the lens system has a narrow field angle and that the lens system produces remarkable distortion which deforms the marginal portion of an image formed thereby.

Furthermore, used as endoscopes are fiber scopes which use image guides and, in addition, video scopes which use solid-state image pickup devices such as CCD's in the distal ends thereof.

In the recent years where video scopes have smaller outside diameters owing to compacter designs of image pickup devices, there are developed video scopes for observing interiors of bronchial tubes and urinary organs.

Video scopes do not permit reproducing colors or images formed on the monitors therefor since the solid-state image pickup devices have sensitivity not only to visible rays but also to infrared rays. It is therefore necessary to arrange filters for shielding the infrared rays in the optical systems of video scopes. Further, when a laser ranging from near infared to far infrared regions is used for medical treatment through video scopes, the laser saturates the CCD's, thereby hindering observation of locations to be treated due to smear and blooming. It is therefore necessary to arrange filters for cutting off wavelengths of the laser in the objective optical systems.

Thickness of the infrared cut filters, CCD cover glass, laser shielding filters, etc. remains unchanged even after the image pickup devices have compacter designs and the optical systems have shorter focal lengths. Accordingly, the optical path lengths as measured in the direction of the thickness of the filters are long relative to the focal lengths.

As an objective lens system for endoscopes comprising filters in the optical system thereof, there is known the lens system which has the composition illustrated in FIG. 1. This optical system is usually of the retrofocus type and satisfies the following relationship.

$$I = f \sin \theta$$

wherein the reference symbol I represents the image height, the reference symbol f designates the focal length of the optical system and the reference symbol $\theta$ denotes the half field angle of the optical system.

In order to arrange filters, $F_1$, $F_2$ and a cover glass C which have long optical path lengths as compared with the focal length f in this type of lens system, it is necessary to select a high retro ratio (a value obtained by dividing the distance as measured from the final surface to the image surface of a lens system by the focal length thereof). When a high retro ratio is selected, without prolonging total length, for a lens system which has a short total length, each of the lens components has strengthened power, thereby making it difficult to correct aberrations. Since focal length of the lens system is further shortened especially by widening field angle thereof, it is impossible to widen the field angle of the lens system.

When an attempt is made to correct aberrations favorably in this type of lens system, the lens system comprises a larger number of lens components, a longer total length accordingly and becomes unsuited for use with endoscopes for observing interiors of thin tubes.

The absorption type of infrared cut filters are usually made of phosphate glass materials. Since the phosphate glass materials have low resistance to humidity, these materials must always be coated so as to prevent contact with ambient air. The coated filters may be injured on the circumferences thereof or the coating may peel off and, in such a condition, the injured portion is exposed to ambient air and may allow the filters to become whitely turbid from the marginal portions thereof. It is necessary to design the filters in such a manner that rays are incident on the filters at the portions rather lower than the outside diameters of the filters. However, in the above-described type of lens system wherein the two filters $F_1$ and $F_2$ are arranged before the CCD cover glass C, rays are incident on the filters at heights which are nearly the same as the image height or higher than the image height, and since the filters are arranged at locations where rays are highest in the lens system, it is impossible to set the heights of rays at levels sufficiently lower than the diameters of the filters.

SUMMARY OF THE INVENTION

A primary object of the present invention is to provide an objective optical system for endoscopes which has a short total length, a small outside diameter, a wide field angle and favorably corrected distortion.

Another object of the present invention is to provide an objective optical system for endoscopes having a short total length and comprising filters on which rays are incident at low portions thereof.

A further object of the present invention is to provide a video endoscope equipped with the objective optical system described above in the distal end thereof.

The objective optical system for endoscopes according to the present invention consists of a front lens unit comprising a lens component having negative refractive power and a rear lens unit comprising a positive lens element which are arranged with an aperture stop interposed therebetween, each of said front lens unit and said rear lens unit comprising at least one aspherical surface, said front lens unit satisfying either of the following conditions (A) and (B), said rear lens unit satisfying either of the following conditions (C) and (D), and said objective optical system satisfying the following condition (E):

(A) The aspherical surface which has a shape including portions having curvature progressively enhanced as the portions are farther from the optical axis is arranged as an object side surface in said front lens unit.

(B) The aspherical surface which has a shape including portions having curvature is progressively lowered as the portions are farther from the optical axis is arranged as an image side surface in said front lens unit.

(C) The aspherical surface which has a shape having curvature is progressively lowered as the portions are farther from the optical axis is arranged as an object side surface in said rear lens unit.

(D) The aspherical surface which has a shape including portions having curvature progressively enhanced as the portions are farther from the optical axis is arranged as an image side surface in said rear lens unit.

(E) $0.2f < D_A < 8f$ wherein the reference symbol $D_A$ represents the optical path length as measured from the aperture stop to the aspherical surface arranged in the rear lens unit.

Description will be made below on the reason why both distortion and curvature of field are corrected sufficiently favorably in the objective optical system for endoscopes using the aspherical surfaces as explained above.

The conventional objective optical system, for endoscopes having the composition illustrated in FIG. 1 produces strongly negative distortion because the principal ray is refracted, as image height increases, by the front lens unit and the rear lens unit in the direction to widen the field angle when the principal ray is traced inversely from the image side. It is therefore possible to correct the strongly negative distortion by arranging an aspherical surface which weakens refractive power for the principal ray as the surface portions are farther from the optical axis.

For this purpose, it is sufficient to design an object side surface on a lens component arranged in the front lens unit so as to include portions whose curvature is enhanced as the portions are farther from the optical axis, to design an image side surface of a lens component arranged in the front lens unit so as to include portions whose curvature is lowered as the portions are farther from the optical axis, to design an object side surface of a lens component arranged in the rear lens unit so as to include portions whose curvature is lowered as the portions are farther from the optical axis or to design an image side surface of a lens component arranged in the rear lens unit so as to include portions whose curvature is enhanced as the portions are farther from the optical axis.

The surfaces illustrated in FIG. 2 and FIG. 3 are also included among the surfaces whose curvature is progressively enhanced as the surface portions are farther from the optical axes. Sign of curvature is considered as positive when the center of the spherical surface in contact with the aspherical surface of interest at a certain point is located on the object side of the aspherical surface or as negative when the center of the spherical surface in contact with the aspherical surface at a certain point is located on the image side of the aspherical surface. Therefore, FIG. 2 shows an example of aspherical surface whose curvature is progressively enhanced as the surface portions are farther from the optical axis (when the signs of curvature are taken into consideration, the negative curvature of a surface concave on the object side is enhanced to the positive curvature of a surface convex on the object side). In the example shown in FIG. 3, curvature is once enhanced and then is lowered. The aspherical surface shown in FIG. 3 is usable for correcting distortion since undulation of a distortion curve as shown in FIG. 4 is practially allowable, and the marginal portion of the aspherical surface through which the lower ray passes but the principal ray does not pass has no relation to the correction of distortion.

FIG. 5 and FIG. 6 exemplify surfaces whose curvature is progressively lowered as the surface portions are farther from the optical axis.

As is understood from the foregoing description, the aspherical surface to be arranged in the front lens unit of the objective optical system for endoscopes according to the present invention is a surface, which may be such an aspherical surface as that shown in FIG. 2 or FIG. 3, including at least portions whose curvature is progressively enhanced as the portions are farther from the optical axis when the aspherical surface is designed as an object side surface of a lens element, or a surface, which may be such a surface as that shown in FIG. 5 or FIG. 6, including at least portions whose curvature is progressively lowered as the portions are farther from the optical axis when it is designed as an image side surface of a lens element. The objective lens system comprising at least one aspherical surface such as that described above is capable of favorably correcting distortion.

Shape of an aspherical surface can generally be expressed by the following formula (i):

$$x = \frac{Cy^2}{1 + \sqrt{1 - pC^2y^2}} + By^2 + Ey^4 + Fy^6 + Gy^8 + \ldots$$

wherein the reference symbols x and y represent coordinates values when the optical axis is taken as the abscissa, the direction toward the image is taken as positive, the intersection between the optical axis and the aspherical surface is taken as the origin, and the direction perpendicular to the abscissa is taken as the ordinate as shown in FIG. 7, the reference symbol C designates the inverse number of the radius of curvature of the circle in contact with the aspherical surface in the vicinity of the optical axis, the reference symbol p denotes the conical constant, and the reference symbols B, E, F, G, ... represent the aspherical surface coefficients of the second order, fourth order, sixth order and eighth order respectively.

In the objective optical system for endoscopes according to the present invention, it is desirable that departure between the plane surface and the aspherical surface used as the extremely object side surface of the front lens unit, i.e., values of the aspherical surface coefficient of the fourth order E and the aspherical surface coefficient of the sixth order F satisfy at least either of the following conditions (5) and (6):

$$0.0006/f^3 < E < 0.6/f^3 \tag{5}$$

$$0.0001/f^5 < F < 0.1/f^5 \tag{6}$$

In order to correct distortion sufficiently favorably by the aspherical surface used in the front lens unit, $0.0006/f^3$ must be smaller than the value of E. That is to say, distortion cannot be corrected sufficiently favorably when the lower limit of the condition (5) is exceeded. If the upper limit of the condition (5) is exceeded, in contrast, it will be impossible to correct astigmatism and the lens element can be difficultly manufactured.

Further, it is possible to correct distortion by selecting a value of F so as to satisfy the condition (6). If the lower limit of the condition (6) is exceeded, distortion will be corrected insufficiently. If the upper limit of the condition (6) is exceeded, in contrast, it will be impossible to correct astigmatism sufficiently and the lens element can hardly be manufactured.

When only distortion is to be corrected in a lens system such as the objective optical system for endoscopes according to the present invention, it is sufficient to arrange the above-described aspherical surface only on either side of the aperture stop. In such a case, however, the meridional curvature of field will be largely swollen at the intermediate image height and image quality will be remarkably degraded. When an aspherical surface is arranged in each of the front lens unit and the rear lens unit, the meridional curvature of field due to the aspherical surface arranged in the front lens unit and the meridional curvature of field due to the aspherical surface arranged in the rear lens unit are swollen in the direction reverse to each other and cancelled with each other, thereby effacing the swelling in the optical system as a whole.

In the objective optical system for endoscopes according to the present invention, it is desirable that the aspherical surface arranged in the rear lens unit satisfies the following condition (7):

$$0.2f < D_A < 8f \qquad (7)$$

wherein the reference symbol $D_A$ represents the optical path length as measured from the aperture stop to the aspherical surface, said optical path length including, when a lens is interposed in the section, a value obtained by dividing thickness on the optical axis by the refractive index thereof.

By arranging the aspherical surface in the rear lens unit at a location rather close to the aperture stop, it is possible to reserve a large difference between the heights of the upper ray and the lower ray passing through the aspherical surface and accordingly to obtain an advantage for correction of coma. If the aspherical surface is too close to the aperture stop, however, correction of astigmatism will undesirably become difficult.

Let us now define Seidel's aberrations as expressed by the formulae (ii) and (iii) to be described later. These definitions are the same as those adopted for the universal lens design program ACCOS-V. When the object distance is represented by OB, the numerical aperture of the marginal ray is designated by NA and the refractive index of the medium located on the object side of the first lens surface is denoted by $n_0$, ACCOS-V determines the height of ray on the first surface by the following formula:

$$H_0 = OB \times \tan\{\sin^{-1}(NA/n_0)\}$$

In contrast, the present invention determines the height of ray H: by the following formula:

$$H_0 = OB \times (NA/n_0)$$

Accordingly, each of the aberration coefficients is determined in the present invention by performing the paraxial tracing on the basis of $H_0$ calculated as $H_0 = OB \times (NA/n_0)$. NA is taken as ½FNO.

Speaking more concretely, the aberration coefficient for the meridional ray ($\overline{X}=0$) is calculated by the formula (ii), whereas the aberration coefficient for the sagital ray ($\overline{Y}=0$) is calculated by the formula (iii):

$$\Delta Y = (SA3)\overline{Y}^3 + (CMA3)\overline{Y^2H} + \{3(AST3) + \qquad (ii)$$
$$(PTZ3)\}YH^2 + (DIS3)\overline{H}^3 +$$
$$(SA5)\overline{Y}^5 + (CMA5)\overline{Y^4H} + (TOBSA)\overline{Y^3H^2} + (ELCMA)\overline{Y^2H^3} +$$
$$\{5(AST5) + (PTZ5)\}\overline{YH^4} + (DIS5)\overline{H}^5 + (SA7)\overline{Y}^7$$

$$\Delta X = (SA3)\overline{X}^3 + \{(AST3) + (PTZ3)\}\overline{XH^2} + \qquad (iii)$$
$$(SA5)\overline{X}^5 + (SOBSA)\overline{X^3H^2} + \{(AST5) + (PTZ5)\}\overline{XH^4} + (SA7)\overline{X}^7$$

In the above-mentioned formula (ii), the reference symbol $\Delta Y$ represents deviation between the paraxial image point (the image point in the aplanatic condition) and the actual image point, the reference symbol $\overline{Y}$ designates the position of incidence of the paraxial principal ray on the image surface normalized to the maximum image height and the reference symbol F denotes the position of incidence of the marginal ray on the pupil surface normalized to the pupil diameter. Further, the reference symbols SA3, SA5 and SA7 represent spherical aberrations of the third order, fifth order and seventh order respectively, the reference symbols CMA3 and CMA5 designate the tangential comas of the third order and fifth order respectively, the reference symbols AST3 and AST5 denote astigmatisms of the third order and fifth order respectively the reference symbols PTZ3 and PTZ5 represent Petzval's sums of the third order and fifth order respectively, the reference symbols DIS3 and DIS5 designate distortion of the third order and fifth order respectively, the reference symbol TOBSA denotes tangential oblique spherical aberration of the fifth order, the reference symbol ELCMA represents elliptic coma of the fifth order, and the reference symbol SOBSA designates sagital oblique spherical aberration of the fifth order.

When the i'th surface in the rear lens unit is designed as an aspherical surface, it can be considered that the i'th surface is obtained by deviating the spherical surface (the reference sphere) for a predetermined distance. Let us represent the coma of the third order produced by the reference sphere by Si, designate the coma of the third order produced by the deviation from the reference sphere by Ai, and denote the values obtained by normalizing Si and Ai to F number by ARi and SRi respectively.

When a plural number of aspherical surfaces are arranged in the rear lens unit, the coma coefficients are expressed as follows:

$$A_R = \Sigma ARi$$

$$S_R = \Sigma SRi$$

When a total of the coefficients of coma of the third order produced by surfaces having negative refractive power in the front lens unit is represented by $A_2$, it is desirable that the front lens unit satisfies the following conditions (8) and (9):

$$-13 < A_2/(A_R + S_R) < -0.03 \qquad (8)$$

$$-0.2 < A_R < 0.2 \qquad (9)$$

Since an objective lens system for endoscopes generally comprises surfaces having strongly negative refractive powers in the front lens unit for obtaining a wide field angle, remarkable coma is produced by these surfaces. It is therefore necessary to cancel this coma with the aberration produced in the rear lens unit so that coma is corrected favorably in the objective lens system as a whole. In addition, when the first lens component consists of a plural number of lens elements as illustrated in FIG. 8 through FIG. 10, the air-contact surface located on the image side has strongly negative refractive power in the case shown in FIG. 8 or FIG. 10 wherein the lens component consists of lens elements cemented to each other, whereas the image side surface of the lens element arranged on the object side has the strongly negative refractive power in the case shown in FIG. 9 wherein the elements of the first lens component are separated from each other. It is necessary to cancel the negative coma produced by these surfaces with the aberration produced in the rear lens unit. It is therefore desirable that $A_2$ and $(A_R+S_R)$ are equal to each other in the absolute values thereof and have signs which are reverse to each other. From the viewpoint of practical use, however, it is sufficient that $A_2/(A_R+S_R)$ is within the range defined by the condition (8).

Further, if $A_R$ has too large a value, the other aberrations will be aggravated and can hardly be corrected. If $A_R$ has too small a value, in contrast, it will be impossible to correct the coma produced by the front lens unit. It is therefore desirable that $A_R$ has a value within the range defined by the condition (9).

Now description will be made on an objective optical system according to the present invention which is characterized in location of a filter. Speaking concretely, the optical system consists, in the order from the object side, of a front lens unit having negative refractive power, an aperture stop and a rear lens unit which has positive refractive power and comprises at least one positive lens component, and comprises either an infrared cut filter or a filter for shielding laser arranged immediately before the aperture stop.

By composing the objective optical system as described above, the present invention has succeeded in shortening total length of the optical system and lowering height of the ray incident on said filter, thereby obtaining high resolution.

In order to reserve a space for arranging the filter immediately before the aperture stop, it is necessary to design the front lens unit so as to satisfy the following condition (10):

$$0.3 < |f_1/f| < 4.0 \qquad (10)$$

wherein the reference symbol $f_1$ represents the focal length of the front lens unit and the reference symbol $f$ designates the focal length of the objective optical system as a whole.

If the lower limit of the condition (10) is exceeded, the airspace reserved between the rear lens unit and the front lens unit will be narrowed, thereby making it difficult to arrange the filter immediately before the aperture stop. If the upper limit of the condition (10) is exceeded, the airspace reserved between the rear lens unit and the front lens unit will be too wide, thereby undesirably prolonging the total length of the objective optical system.

Further, it is desirable that the rear lens unit satisfies the following condition (11):

$$I/f_2 < 0.64 \qquad (11)$$

wherein the reference symbol $f_2$ represents the focal length of the rear lens unit and the reference symbol I designates the maximum image height.

The condition (11) is required for limiting the angle of incidence of the offaxial ray on the filter arranged immediately before the filter.

When the angle of incidence exceeds 40°, transmittance of an interference filter, which is to be used as said infrared cut filter, is abruptly enhanced for the rays in the infrared region and the filter cannot cut off these rays. Further, when an absorption filter is to be used as the infrared cut filter, optical path length in terms of glass thereof is largely different dependently on image heights, thereby producing color ununiformity on the image. Therefore, it is necessary to select a small angle of incidence on the infrared cut filter which may be either an interference filter or an absorption filter.

If the upper limit of the condition (11) is exceeded, the principal ray will have an undesirably large angle of incidence on the filter.

DETAILED DESCRIPTION OF THE PREFERRED EMBODIMENTS

Figure 1:
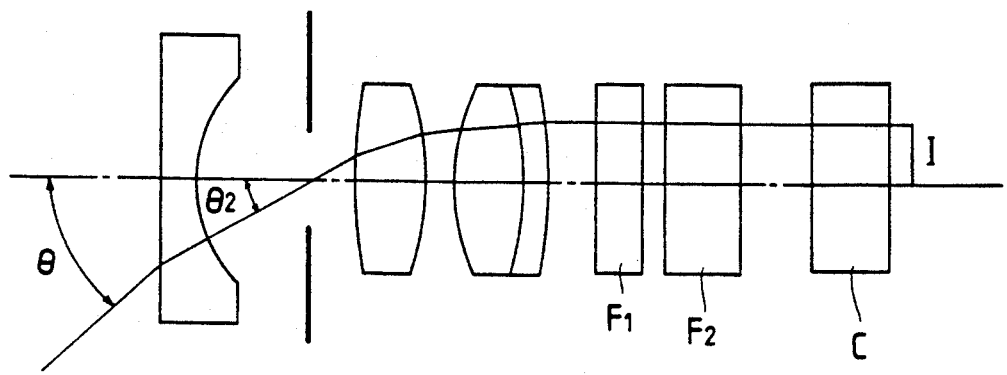
FIG. 1 shows a sectional view illustrating the conventional objective optical system for endoscopes.
Figure 2:
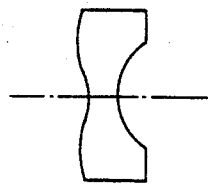
FIG. 2 and FIG. 3 show sectional views illustrating examples of aspherical lens elements having aspherical surfaces on the object side.
Figure 3:
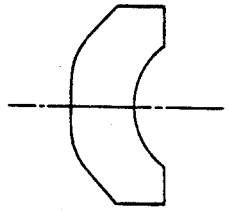
Figure 4:
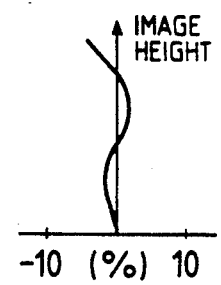
FIG. 4 shows a curve illustrating an example of distortion.
Figure 5:
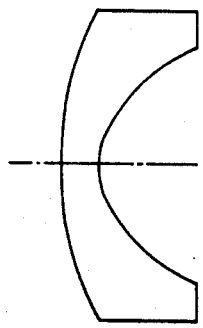
FIG. 5 and FIG. 6 show sectional views illustrating examples of aspherical lens elements having aspherical surfaces on the image side.
Figure 6:
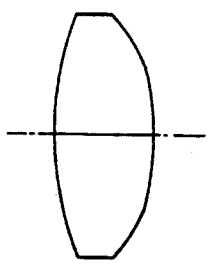
Figure 7:
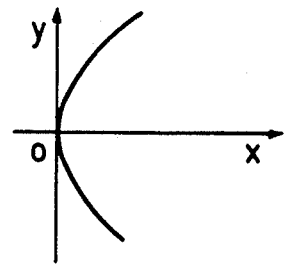
FIG. 7 shows a diagram illustrating the coordinates system for the formula of aspherical surface.
Figure 8:
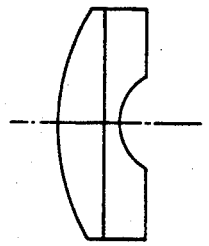
FIG. 8 through FIG. 10 show sectional views illustrating examples of the front lens unit of the objective optical system according to the present invention.
Figure 9:
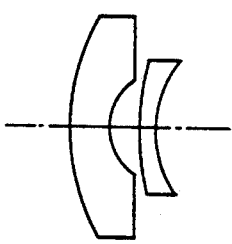
Figure 10:
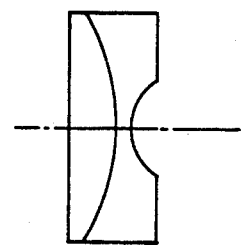
Figure 11:
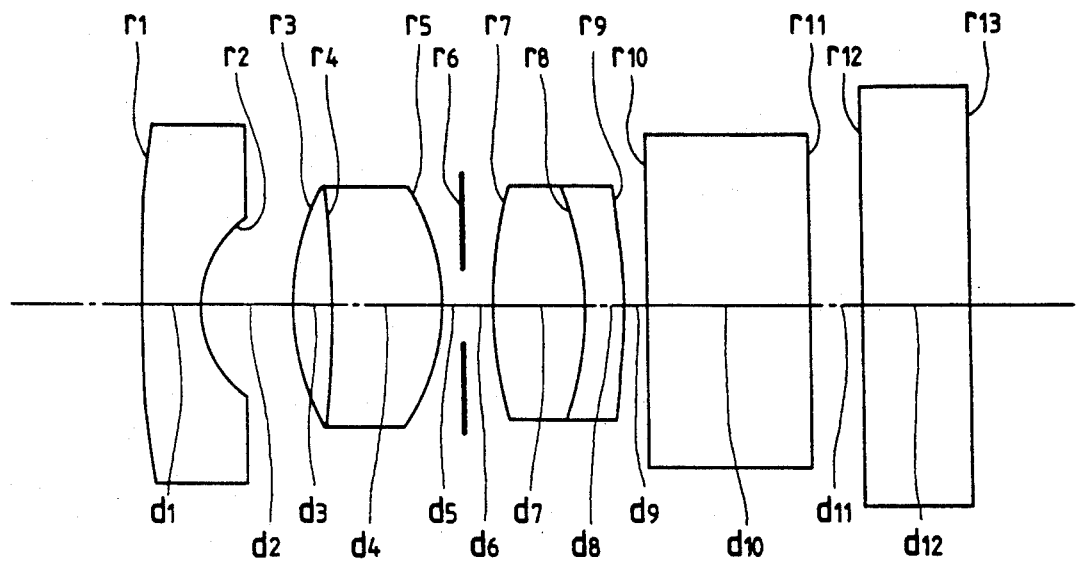
FIG. 11 through FIG. 26 show sectional views illustrating Embodiments 1 through 16 of the objective optical system for endoscopes according to the present invention.
Figure 12:
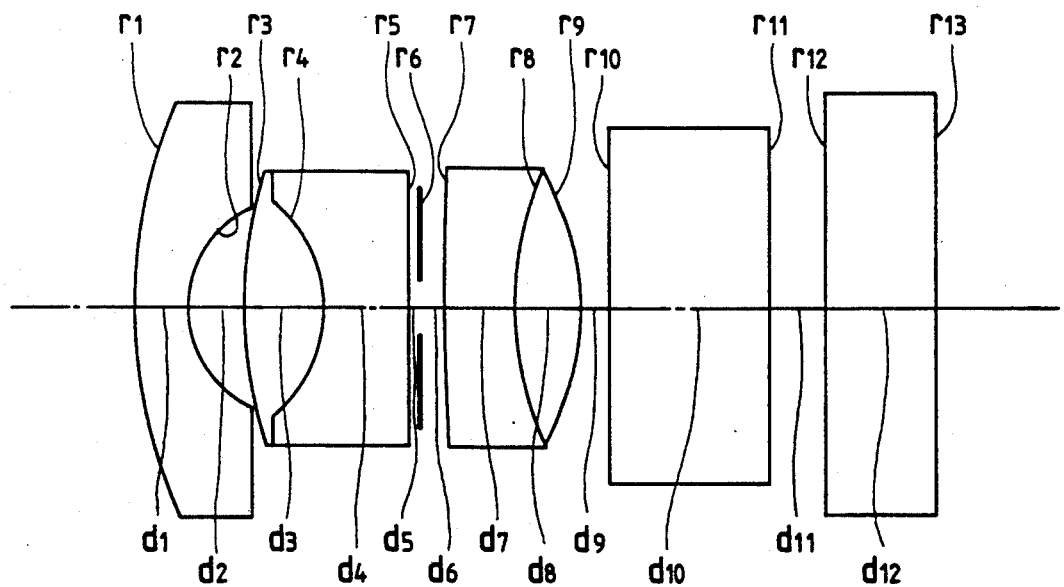
Figure 13:
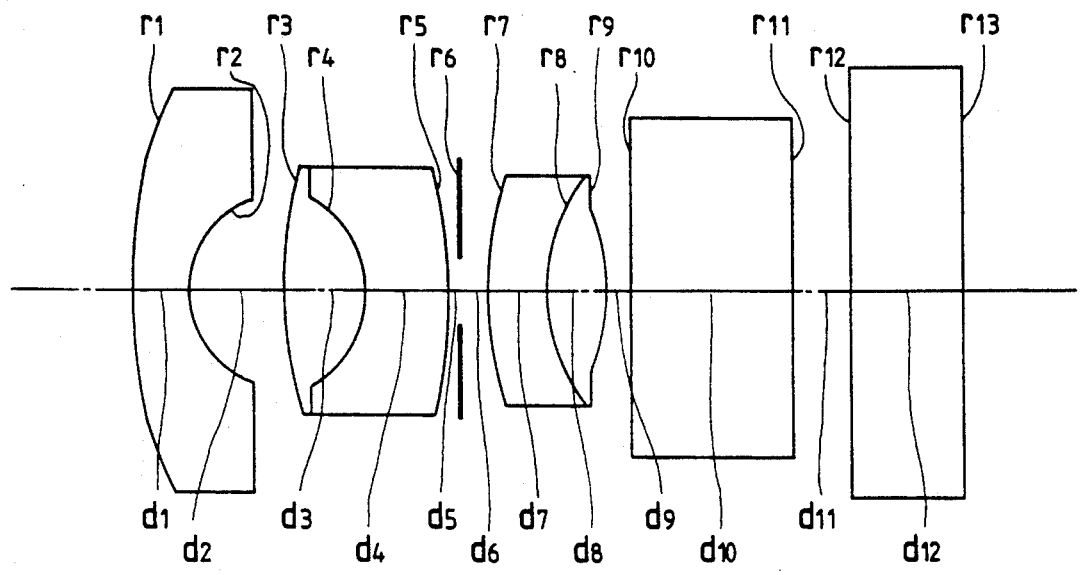
Figure 14:
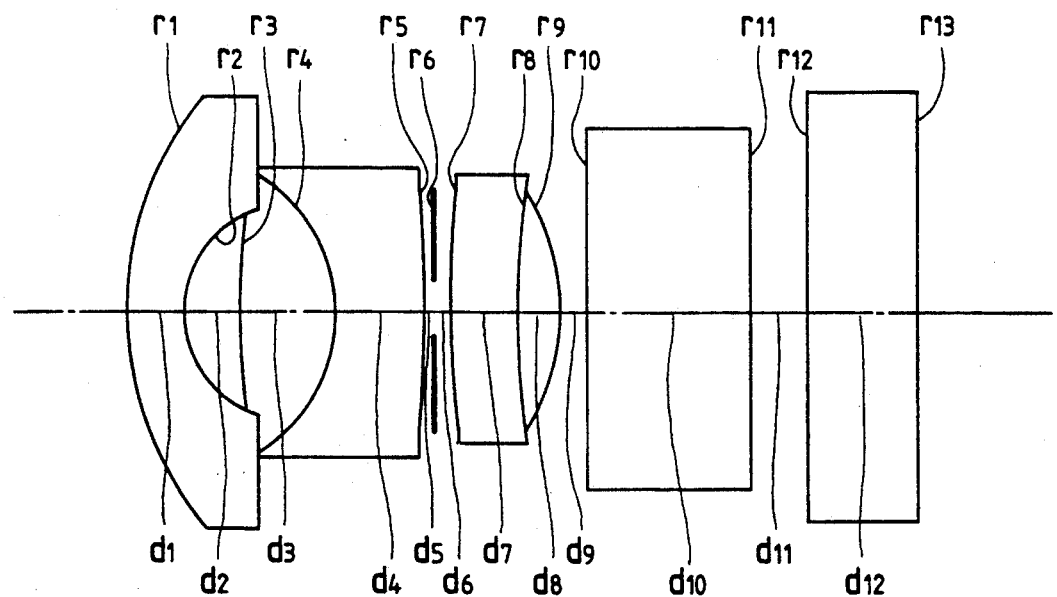
Figure 15:
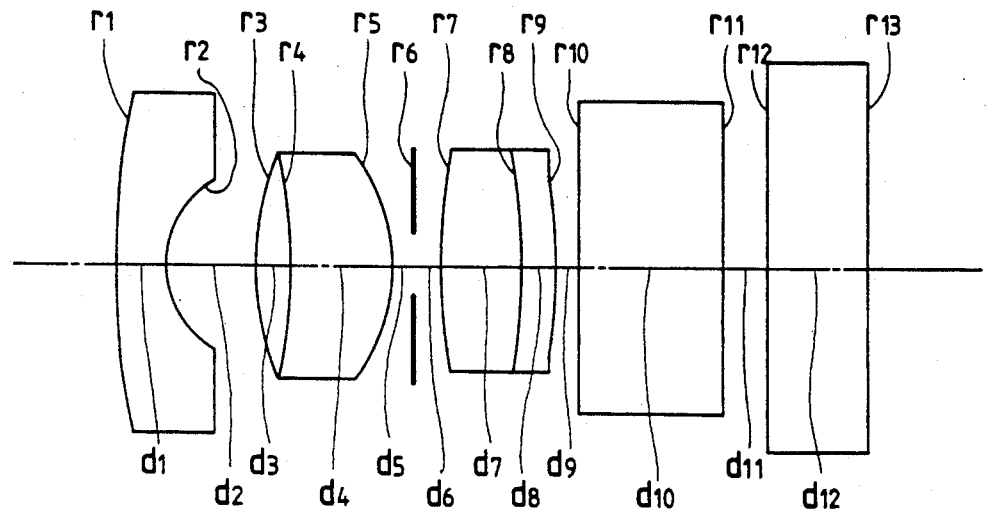
Figure 16:
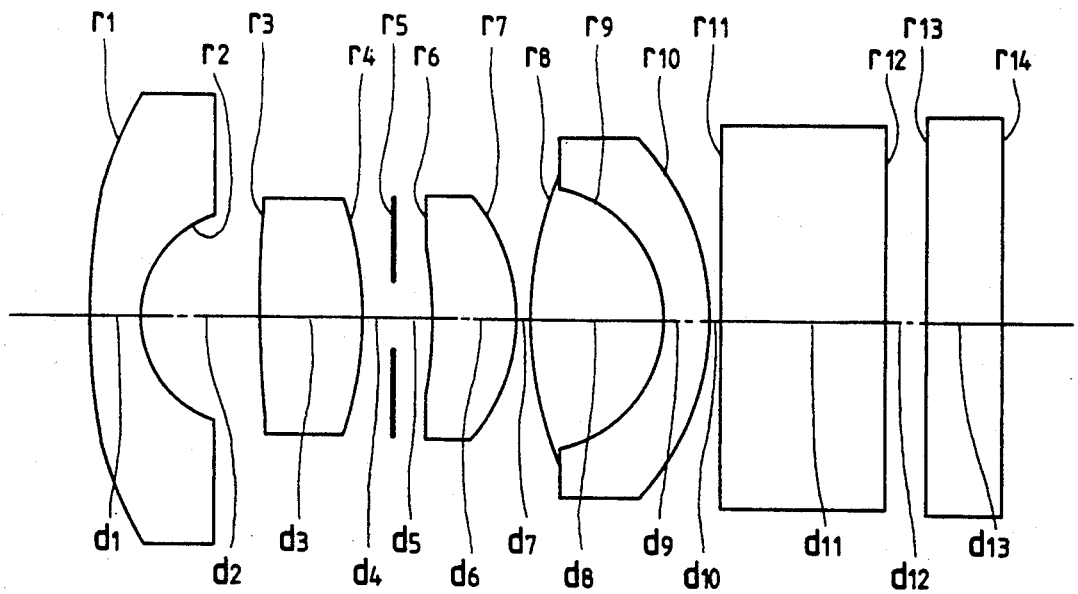

Now, the present invention will be described more detailedly below with reference to the preferred embodiments shown in the accompanying drawings and given in the form of the following numerical data:

Embodiment 1

$f = 1.000$, $F/4.7$, $2\omega = 106°$
$IH = 1.00$

-continued

| | | | |
|---|---|---|---|
| $r_1 = \infty$ (Aspherical surface) | | | |
| | $d_1 = 0.3026$ | $n_1 = 1.80610$ | $\nu_1 = 40.95$ |
| $r_2 = 0.6320$ | | | |
| | $d_2 = 0.5326$ | | |
| $r_3 = 1.4455$ | | | |
| | $d_3 = 0.2291$ | $n_2 = 1.75520$ | $\nu_2 = 27.51$ |
| $r_4 = -6.7934$ | | | |
| | $d_4 = 0.6325$ | $n_3 = 1.56883$ | $\nu_3 = 56.34$ |
| $r_5 = -1.2679$ | | | |
| | $d_5 = 0.1332$ | | |
| $r_6 = \infty$ (Stop) | | | |
| | $d_6 = 0.1724$ | | |
| $r_7 = 2.4437$ | | | |
| | $d_7 = 0.5403$ | $n_4 = 1.51633$ | $\nu_4 = 64.15$ |
| $r_8 = -1.8760$ | | | |
| | $d_8 = 0.2195$ | $n_5 = 1.84666$ | $\nu_5 = 23.78$ |
| $r_9 = -2.8190$ (Aspherical surface) | | | |
| | $d_9 = 0.1332$ | | |
| $r_{10} = \infty$ | | | |
| | $d_{10} = 0.9079$ | $n_6 = 1.52000$ | $\nu_6 = 74.00$ |
| $r_{11} = \infty$ | | | |
| | $d_{11} = 0.2766$ | | |
| $r_{12} = \infty$ | | | |
| | $d_{12} = 0.6053$ | $n_7 = 1.51633$ | $\nu_7 = 64.15$ |
| $r_{13} = \infty$ | | | |

Aspherical coefficient
(1st surface)
  $P = 1.0000$,   $B = 0.23263 \times 10^{-1}$
  $E = 0.34082 \times 10^{-1}$,   $F = -0.48683 \times 10^{-2}$
(9th surface)
  $P = -6.7002$,   $B = 0$
  $E = 0.17408$,   $F = -0.69257 \times 10^{-1}$
  $D_A = 0.6475$,   $A_R = 0.00526$.
$A_2/(A_R - S_R) = -0.996$ Embodiment 2
  $f = 1.000$, $F/4.5$, $2\omega = 113.0°$
  $IH = 1.14$

| | | | |
|---|---|---|---|
| $r_1 = \infty$ (Aspherical surface) | | | |
| | $d_1 = 0.3459$ | $n_1 = 1.80610$ | $\nu_1 = 40.95$ |
| $r_2 = 0.7439$ | | | |
| | $d_2 = 0.3459$ | | |
| $r_3 = 2.6052$ | | | |
| | $d_3 = 0.5328$ | $n_2 = 1.72825$ | $\nu_2 = 28.46$ |
| $r_4 = -0.8588$ | | | |
| | $d_4 = 0.5535$ | $n_3 = 1.58913$ | $\nu_3 = 60.97$ |
| $r_5 = 266.4111$ | | | |
| | $d_5 = 0.0692$ | | |
| $r_6 = \infty$ (Stop) | | | |
| | $d_6 = 0.1683$ | | |
| $r_7 = 24.8283$ | | | |
| | $d_7 = 0.4559$ | $n_4 = 1.53172$ | $\nu_4 = 48.90$ |
| $r_8 = 2.0198$ | | | |
| | $d_8 = 0.4690$ | $n_5 = 1.84100$ | $\nu_5 = 43.23$ |
| $r_9 = -1.3623$ (Aspherical surface) | | | |
| | $d_9 = 0.1730$ | | |
| $r_{10} = \infty$ | | | |
| | $d_{10} = 1.0378$ | $n_6 = 1.52000$ | $\nu_6 = 74.00$ |
| $r_{11} = \infty$ | | | |
| | $d_{11} = 0.3407$ | | |
| $r_{12} = \infty$ | | | |
| | $d_{12} = 0.6919$ | $n_7 = 1.51633$ | $\nu_7 = 64.15$ |
| $r_{13} = \infty$ | | | |

Aspherical coefficient
(1st surface)
  $P = 1.000$,   $B = 0.14569$
  $E = 0.29823 \times 10^{-1}$,   $F = -0.13020 \times 10^{-1}$
(9th surface)
  $P = 1.7759$,   $B = 0$
  $E = 0.14285$,   $F = 0.10574$
  $D_A = 0.7207$,   $A_R = 0.0025$
$A_2/(A_R + S_R) = -0.596$ Embodiment 3
  $f = 1.000$, $F/4.7$, $2\omega = 113.0°$
  $IH = 1.15$

| | | | |
|---|---|---|---|
| $r_1 = \infty$ (Aspherical surface) | | | |
| | $d_1 = 0.3480$ | $n_1 = 1.80610$ | $\nu_1 = 40.95$ |
| $r_2 = 0.6177$ | | | |
| | $d_2 = 0.5740$ | | |
| $r_3 = 2.4828$ | | | |
| | $d_3 = 0.5111$ | $n_2 = 1.72825$ | $\nu_2 = 28.46$ |
| $r_4 = -0.6841$ | | | |
| | $d_4 = 0.5569$ | $n_3 = 1.58921$ | $\nu_3 = 41.08$ |
| $r_5 = -3.2002$ | | | |
| | $d_5 = 0.0696$ | | |
| $r_6 = \infty$ (Stop) | | | |
| | $d_6 = 0.1798$ | | |
| $r_7 = 2.2304$ | | | |
| | $d_7 = 0.3829$ | $n_4 = 1.84666$ | $\nu_4 = 23.78$ |
| $r_8 = 1.1621$ | | | |
| | $d_8 = 0.3921$ | $n_5 = 1.51633$ | $\nu_5 = 64.15$ |
| $r_9 = -1.1830$ (Aspherical surface) | | | |
| | $d_9 = 0.1740$ | | |
| $r_{10} = \infty$ | | | |
| | $d_{10} = 1.0441$ | $n_6 = 1.52000$ | $\nu_6 = 74.00$ |
| $r_{11} = \infty$ | | | |
| | $d_{11} = 0.3554$ | | |
| $r_{12} = \infty$ | | | |
| | $d_{12} = 0.6961$ | $n_7 = 1.51633$ | $\nu_7 = 64.15$ |
| $r_{13} = \infty$ | | | |

Aspherical coefficient
(1st surface)
  $P = 1.0000$,   $B = 0.11531$
  $E = 0.26826 \times 10^{-1}$,   $F = 0.98377 \times 10^{-3}$
(9th surface)
  $P = 2.8824$,   $B = 0$, $E = 0.24847$
  $F = 0.77271$,   $G = -0.48669 \times 10^{-1}$
  $D_A = 0.6457$,   $A_R = 0.00135$.
$A_2/(A_R + S_R) = -1.328$ Embodiment 4
  $f = 1.000$, $F/4.6$, $2\omega = 112.4°$
  $IH = 1.12$

| | | | |
|---|---|---|---|
| $r_1 = \infty$ (Aspherical surface) | | | |
| | $d_1 = 0.3382$ | $n_1 = 1.80610$ | $\nu_1 = 40.95$ |
| $r_2 = 0.7123$ | | | |
| | $d_2 = 0.3382$ | | |
| $r_3 = 4.2817$ | | | |
| | $d_3 = 0.6242$ | $n_2 = 1.72825$ | $\nu_2 = 28.46$ |
| $r_4 = -1.0308$ | | | |
| | $d_4 = 0.5411$ | $n_3 = 1.58913$ | $\nu_3 = 60.97$ |
| $r_5 = -14.9956$ | | | |
| | $d_5 = 0.0676$ | | |
| $r_6 = \infty$ (Stop) | | | |
| | $d_6 = 0.1112$ | | |
| $r_7 = 10.0801$ | | | |
| | $d_7 = 0.4259$ | $n_4 = 1.53172$ | $\nu_4 = 48.90$ |
| $r_8 = 5.8518$ | | | |
| | $d_8 = 0.2662$ | $n_5 = 1.84100$ | $\nu_5 = 43.23$ |
| $r_9 = -1.1895$ (Aspherical surface) | | | |
| | $d_9 = 0.1691$ | | |
| $r_{10} = \infty$ | | | |
| | $d_{10} = 1.0146$ | $n_6 = 1.52000$ | $\nu_6 = 74.00$ |
| $r_{11} = \infty$ | | | |
| | $d_{11} = 0.3466$ | | |
| $r_{12} = \infty$ | | | |
| | $d_{12} = 0.6765$ | $n_7 = 1.51633$ | $\nu_7 = 64.15$ |
| $r_{13} = \infty$ | | | |

Aspherical coefficient
(1st surface)
  $P = 1.000$,   $B = 0.23401$
  $E = 0$,   $F = 0.93316 \times 10^{-2}$
(9th surface)
  $P = -0.306$,   $B = 0$
  $E = 0.33663 \times 10^{-1}$,   $F = 0.51107 \times 10^{-1}$
  $D_A = 0.5338$,   $A_R = -0.0108$
$A_2/(A_R + S_R) = -0.502$ Embodiment 5
  $f = 1.000$, $F/4.6$, $2\omega = 106°$
  $IH = 1.00$

| | | | |
|---|---|---|---|
| $r_1 = \infty$ (Aspherical surface) | | | |
| | $d_1 = 0.3026$ | $n_1 = 1.80610$ | $\nu_1 = 40.95$ |
| $r_2 = 0.6333$ | | | |
| | $d_2 = 0.5326$ | | |
| $r_3 = 1.7941$ | | | |
| | $d_3 = 0.2287$ | $n_2 = 1.75520$ | $\nu_2 = 27.51$ |
| $r_4 = -2.6805$ | | | |
| | $d_4 = 0.6325$ | $n_3 = 1.56883$ | $\nu_3 = 56.34$ |
| $r_5 = -1.1728$ | | | |
| | $d_5 = 0.1332$ | | |
| $r_6 = \infty$ (Stop) | | | |
| | $d_6 = 0.1721$ | | |

-continued

| | | | |
|---|---|---|---|
| $r_7 = 4.7481$ | | | |
| | $d_7 = 0.5368$ | $n_4 = 1.51633$ | $\nu_4 = 64.15$ |
| $r_8 = -3.0936$ | | | |
| | $d_8 = 0.2169$ | $n_5 = 1.84666$ | $\nu_5 = 23.78$ |
| $r_9 = -2.4248$ (Aspherical surface) | | | |
| | $d_9 = 0.1332$ | | |
| $r_{10} = \infty$ | | | |
| | $d_{10} = 0.9079$ | $n_6 = 1.52000$ | $\nu_6 = 74.00$ |
| $r_{11} = \infty$ | | | |
| | $d_{11} = 0.2713$ | | |
| $r_{12} = \infty$ | | | |
| | $d_{12} = 0.6053$ | $n_7 = 1.51633$ | $\nu_7 = 64.15$ |
| $r_{13} = \infty$ | | | |

Aspherical coefficient
(1st surface)
  $P = 1.000$,       $B = 0.83810 \times 10^{-1}$
  $E = 0$,             $F = 0.75968 \times 10^{-2}$
(9th surface)
  $P = 0.3802$,    $B = 0$
  $E = 0.14794$,  $F = 0.21801 \times 10^{-1}$
  $D_A = 0.6436$,  $A_R = 0.00353$
$A_2/(A_R + S_R) = 1.334$ Embodiment 6

$f = 1.000$, $F/3.7$, $2\omega = 135.9°$
$IH = 1.41$

| | | | |
|---|---|---|---|
| $r_1 = \infty$ (Aspherical surface) | | | |
| | $d_1 = 0.4132$ | $n_1 = 1.88300$ | $\nu_1 = 40.78$ |
| $r_2 = 0.9706$ | | | |
| | $d_2 = 0.9885$ | | |
| $r_3 = 10.5419$ | | | |
| | $d_3 = 0.8724$ | $n_2 = 1.84666$ | $\nu_2 = 23.78$ |
| $r_4 = -3.2037$ | | | |
| | $d_4 = 0.2755$ | | |
| $r_5 = \infty$ (Stop) | | | |
| | $d_5 = 0.3449$ | | |
| $r_6 = -3.5233$ | | | |
| | $d_6 = 0.7526$ | $n_3 = 1.51633$ | $\nu_3 = 64.15$ |
| $r_7 = -1.6611$ | | | |
| | $d_7 = 0.1412$ | | |
| $r_8 = 3.2843$ | | | |
| | $d_8 = 1.1786$ | $n_4 = 1.58913$ | $\nu_4 = 60.97$ |
| $r_9 = -1.2919$ (Aspherical surface) | | | |
| | $d_9 = 0.3673$ | $n_5 = 1.84666$ | $\nu_5 = 23.78$ |
| $r_{10} = -2.2845$ | | | |
| | $d_{10} = 0.0918$ | | |
| $r_{11} = \infty$ | | | |
| | $d_{11} = 1.3774$ | $n_6 = 1.51633$ | $\nu_6 = 64.15$ |
| $r_{12} = \infty$ | | | |
| | $d_{12} = 0.3398$ | | |
| $r_{13} = \infty$ | | | |
| | $d_{13} = 0.6428$ | $n_7 = 1.51633$ | $\nu_7 = 64.15$ |
| $r_{14} = \infty$ | | | |

Aspherical coefficient
(1st surface)
  $P = 1.000$,                      $B = 0.53237 \times 10^{-1}$
  $E = 0.37136 \times 10^{-1}$, $F = -0.10040 \times 10^{-1}$
  $G = 0.13094 \times 10^{-2}$
(9th surface)
  $P = 0.8681$,                   $B = 0$
  $E = -0.14223$,                $F = 0.39404 \times 10^{-1}$
  $G = -0.62118 \times 10^{-1}$
  $D_A = 1.724$,                  $A_R = 0.0108$
$A_2/(A_R + S_R) = -0.605$ Embodiment 7

$f = 1$, $F/6.065$, $2\omega = 96°$

| | | | |
|---|---|---|---|
| $r_1 = \infty$ | | | |
| | $d_1 = 0.4484$ | $n_1 = 1.51633$ | $\nu_1 = 64.15$ |
| $r_2 = 0.6543$ | | | |
| | $d_2 = 0.3906$ | | |
| $r_3 = \infty$ | | | |
| | $d_3 = 0.9268$ | $n_2 = 1.51633$ | $\nu_2 = 64.15$ |
| $r_4 = \infty$ (Stop) | | | |
| | $d_4 = 0.1504$ | | |
| $r_5 = -2.5940$ | | | |
| | $d_5 = 0.7961$ | $n_3 = 1.88300$ | $\nu_3 = 40.78$ |
| $r_6 = -1.3698$ | | | |
| | $d_6 = 0.1495$ | | |
| $r_7 = 2.8985$ | | | |
| | $d_7 = 0.5105$ | $n_4 = 1.84666$ | $\nu_4 = 23.78$ |
| $r_8 = 1.2075$ | | | |

-continued

| | | | |
|---|---|---|---|
| | $d_8 = 1.3163$ | $n_5 = 1.58913$ | $\nu_5 = 60.97$ |
| $r_9 = -1.9538$ | | | |
| | $d_9 = 0.1495$ | | |
| $r_{10} = \infty$ | | | |
| | $d_{10} = 0.5232$ | $n_6 = 1.51633$ | $\nu_6 = 64.15$ |
| $r_{11} = \infty$ | | | |
| | $d_{11} = 0.4683$ | | |
| $r_{12} = \infty$ | | | |
| | $d_{12} = 1.4948$ | $n_7 = 1.51633$ | $\nu_7 = 64.15$ |
| $r_{13} = \infty$ | | | |

$|f_1/f| = 1.267$, $I/f_2 = 0.516$, $D/f = 1.949$
Incidence angle in 1st filter 25.3°

Embodiment 8

$f = 1$, $F/5.526$, $2\omega = 120°$

| | | | |
|---|---|---|---|
| $r_1 = \infty$ | | | |
| | $d_1 = 0.5223$ | $n_1 = 1.51633$ | $\nu_1 = 64.15$ |
| $r_2 = 0.6521$ | | | |
| | $d_2 = 0.4311$ | | |
| $r_3 = \infty$ | | | |
| | $d_3 = 1.0793$ | $n_2 = 1.51633$ | $\nu_2 = 64.15$ |
| $r_4 = \infty$ (Stop) | | | |
| | $d_4 = 0.1871$ | | |
| $r_5 = -2.8407$ | | | |
| | $d_5 = 0.9761$ | $n_3 = 1.88300$ | $\nu_3 = 40.78$ |
| $r_6 = -1.7120$ | | | |
| | $d_6 = 0.1742$ | | |
| $r_7 = 2.7683$ | | | |
| | $d_7 = 0.5818$ | $n_4 = 1.84666$ | $\nu_4 = 23.78$ |
| $r_8 = 1.2503$ | | | |
| | $d_8 = 1.5320$ | $n_5 = 1.58913$ | $\nu_5 = 60.97$ |
| $r_9 = -1.9698$ | | | |
| | $d_9 = 0.1741$ | | |
| $r_{10} = \infty$ | | | |
| | $d_{10} = 0.6093$ | $n_6 = 1.51633$ | $\nu_6 = 64.15$ |
| $r_{11} = \infty$ | | | |
| | $d_{11} = 0.5223$ | | |
| $r_{12} = \infty$ | | | |
| | $d_{12} = 1.7409$ | $n_7 = 1.51633$ | $\nu_7 = 64.15$ |
| $r_{13} = \infty$ | | | |

$|f_1/f| = 1.263$, $I/f_2 = 0.533$, $D/f = 2.246$
Incidence angle in 1st filter 28.4°

Embodiment 9

$f = 1$, $F/3.899$, $2\omega = 101°$

| | | | |
|---|---|---|---|
| $r_1 = \infty$ | | | |
| | $d_1 = 0.4664$ | $n_1 = 1.88300$ | $\nu_1 = 40.78$ |
| $r_2 = 0.7372$ | | | |
| | $d_2 = 0.5416$ | | |
| $r_3 = \infty$ | | | |
| | $d_3 = 0.6018$ | $n_2 = 1.52287$ | $\nu_2 = 59.89$ |
| $r_4 = \infty$ (Stop) | | | |
| | $d_4 = 0.1505$ | | |
| $r_5 = 16.9033$ | | | |
| | $d_5 = 0.8726$ | $n_3 = 1.72916$ | $\nu_3 = 54.68$ |
| $r_6 = -1.3616$ | | | |
| | $d_6 = 0.1505$ | | |
| $r_7 = \infty$ | | | |
| | $d_7 = 0.9328$ | $n_4 = 1.52000$ | $\nu_4 = 74.00$ |
| $r_8 = \infty$ | | | |
| | $d_8 = 0.5567$ | | |
| $r_9 = 2.3531$ | | | |
| | $d_9 = 1.1886$ | $n_5 = 1.60311$ | $\nu_5 = 60.70$ |
| $r_{10} = -1.4142$ | | | |
| | $d_{10} = 0.3159$ | $n_6 = 1.84666$ | $\nu_6 = 23.78$ |
| $r_{11} = -4.8145$ | | | |
| | $d_{11} = 0.4514$ | | |
| $r_{12} = \infty$ | | | |
| | $d_{12} = 1.5045$ | $n_7 = 1.51633$ | $\nu_7 = 64.15$ |
| $r_{13} = \infty$ | | | |

$|f_1/f| = 0.835$, $I/f_2 = 0.475$
$f_{21}/f_2 = 1.067$, $f_{22}/f_2 = 2.365$
Incidence angle in 1st filter 21.7°

Embodiment 10

$f = 1$, $F/3.870$, $2\omega = 120°$

| | | | |
|---|---|---|---|
| $r_1 = \infty$ | | | |
| | $d_1 = 0.5072$ | $n_1 = 1.88300$ | $\nu_1 = 40.78$ |
| $r_2 = 0.6938$ | | | |
| | $d_2 = 0.6135$ | | |
| $r_3 = \infty$ | | | |

-continued

|  |  |  |  |
|---|---|---|---|
| | $d_3 = 0.6763$ | $n_2 = 1.52287$ | $\nu_2 = 59.89$ |
| $r_4 = \infty$ (Stop) | | | |
| | $d_4 = 0.1655$ | | |
| $r_5 = 5.1647$ | | | |
| | $d_5 = 0.9875$ | $n_3 = 1.72916$ | $\nu_3 = 54.68$ |
| $r_6 = -1.8356$ | | | |
| | $d_6 = 0.1836$ | | |
| $r_7 = \infty$ | | | |
| | $d_7 = 1.0482$ | $n_4 = 1.52000$ | $\nu_4 = 74.00$ |
| $r_8 = \infty$ | | | |
| | $d_8 = 0.6401$ | | |
| $r_9 = 2.2962$ | | | |
| | $d_9 = 1.3483$ | $n_5 = 1.60311$ | $\nu_5 = 60.70$ |
| $r_{10} = -1.3264$ | | | |
| | $d_{10} = 0.4923$ | $n_6 = 1.84666$ | $\nu_6 = 23.78$ |
| $r_{11} = -4.0870$ | | | |
| | $d_{11} = 0.5072$ | | |
| $r_{12} = \infty$ | | | |
| | $d_{12} = 1.6907$ | $n_7 = 1.51633$ | $\nu_7 = 64.15$ |
| $r_{13} = \infty$ | | | |

$|f_1/f| = 0.786$, $I/f_2 = 0.447$
$f_{21}/f_2 = 0.999$, $f_{22}/f_2 = 1.844$
Incidence angle in 1st filter 22.3°

Embodiment 11

$f = 1$, F/4.067, $2\omega = 120.2°$

| | | | |
|---|---|---|---|
| $r_1 = 16.8803$ (Aspherical surface) | | | |
| | $d_1 = 0.6472$ | $n_1 = 1.51633$ | $\nu_1 = 64.15$ |
| $r_2 = 0.8621$ | | | |
| | $d_2 = 0.5965$ | | |
| $r_3 = \infty$ | | | |
| | $d_3 = 1.4574$ | $n_2 = 1.51633$ | $\nu_2 = 64.15$ |
| $r_4 = \infty$ (Stop) | | | |
| | $d_4 = 0.2687$ | | |
| $r_5 = -3.9741$ | | | |
| | $d_5 = 1.1815$ | $n_3 = 1.88300$ | $\nu_3 = 40.78$ |
| $r_6 = -2.0865$ | | | |
| | $d_6 = 0.2127$ | | |
| $r_7 = 3.6172$ | | | |
| | $d_7 = 0.2687$ | $n_4 = 1.84666$ | $\nu_4 = 23.78$ |
| $r_8 = 1.5713$ | | | |
| | $d_8 = 1.7548$ | $n_5 = 1.58913$ | $\nu_5 = 60.97$ |
| $r_9 = -1.8576$ (Aspherical surface) | | | |
| | $d_9 = 0.1221$ | | |
| $r_{10} = \infty$ | | | |
| | $d_{10} = 0.7327$ | $n_6 = 1.51633$ | $\nu_6 = 64.15$ |
| $r_{11} = \infty$ | | | |
| | $d_{11} = 0.5129$ | | |
| $r_{12} = \infty$ | | | |
| | $d_{12} = 1.6486$ | $n_7 = 1.51633$ | $\nu_7 = 64.15$ |
| $r_{13} = \infty$ | | | |

Aspherical coefficient
(1st surface)
  $P = 1.0000$, $B = 0$, $E = 0.88523 \times 10^{-2}$
  $F = 0.92065 \times 10^{-4}$
(9th surface)
  $P = 1.0000$, $B = 0$, $E = 0.28532 \times 10^{-1}$
  $F = -0.12887 \times 10^{-2}$
$|f_1/f| = 1.784$, $I/f_2 = 0.606$, $D/f = 2.205$
$f_2/f = 1.830$, $\theta/0.64$ (rad) $= 1.636$, $D_A = 2.359$
Incidence angle in 1st filter 33.8°

Embodiment 12

$f = 1$, F/3.890, $2\omega = 120°$

| | | | |
|---|---|---|---|
| $r_1 = 21.4252$ (Aspherical surface) | | | |
| | $d_1 = 0.6582$ | $n_1 = 1.51633$ | $\nu_1 = 64.15$ |
| $r_2 = 0.7634$ | | | |
| | $d_2 = 0.5806$ | | |
| $r_3 = \infty$ | | | |
| | $d_3 = 1.3603$ | $n_2 = 1.51633$ | $\nu_2 = 64.15$ |
| $r_4 = \infty$ (Stop) | | | |
| | $d_4 = 0.2327$ | | |
| $r_5 = -1.8851$ | | | |
| | $d_5 = 1.2486$ | $n_3 = 1.88300$ | $\nu_3 = 40.78$ |
| $r_6 = -1.9074$ | | | |
| | $d_6 = 0.1586$ | | |
| $r_7 = 3.3202$ (Aspherical surface) | | | |
| | $d_7 = 0.3151$ | $n_4 = 1.84666$ | $\nu_4 = 23.78$ |
| $r_8 = 2.0796$ | | | |
| | $d_8 = 1.7611$ | $n_5 = 1.58913$ | $\nu_5 = 60.97$ |
| $r_9 = -2.2592$ | | | |
| | $d_9 = 0.2194$ | | |
| $r_{10} = \infty$ | | | |
| | $d_{10} = 0.7679$ | $n_6 = 1.51633$ | $\nu_6 = 64.15$ |
| $r_{11} = \infty$ | | | |
| | $d_{11} = 0.6582$ | | |
| $r_{12} = \infty$ | | | |
| | $d_{12} = 2.1426$ | $n_7 = 1.51633$ | $\nu_7 = 64.15$ |
| $r_{13} = \infty$ | | | |

Aspherical coefficient
(1st surface)
  $P = 1.0000$, $B = 0$, $E = 0.22760 \times 10^{-1}$
  $F = -0.71077 \times 10^{-3}$
(7th surface)
  $P = 1.0000$, $B = 0$, $E = -0.20373 \times 10^{-1}$
  $F = 0.15996 \times 10^{-2}$
$|f_1/f| = 1.55$, $I/f_2 = 0.619$, $D/f = 2.797$
$f_2/f = 1.849$, $\theta/0.64$ (rad) $= 1.636$, $D_A = 1.054$
Incidence angle in 1st filter 36.1°

Embodiment 13

$f = 1$, F/4.186, $2\omega = 117.40°$

| | | | |
|---|---|---|---|
| $r_1 = 12.9649$ (Aspherical surface) | | | |
| | $d_1 = 0.6251$ | $n_1 = 1.51633$ | $\nu_1 = 64.15$ |
| $r_2 = 0.7064$ | | | |
| | $d_2 = 0.5202$ | | |
| $r_3 = \infty$ | | | |
| | $d_3 = 1.3014$ | $n_2 = 1.51633$ | $\nu_2 = 64.15$ |
| $r_4 = \infty$ (Stop) | | | |
| | $d_4 = 0.2287$ | | |
| $r_5 = -4.1941$ | | | |
| | $d_5 = 1.1762$ | $n_3 = 1.88300$ | $\nu_3 = 40.78$ |
| $r_6 = -1.8012$ (Aspherical surface) | | | |
| | $d_6 = 0.2733$ | | |
| $r_7 = 3.3810$ | | | |
| | $d_7 = 0.662$ | $n_4 = 1.84666$ | $\nu_4 = 23.78$ |
| $r_8 = 1.4568$ | | | |
| | $d_8 = 1.7429$ | $n_5 = 1.58913$ | $\nu_5 = 60.97$ |
| $r_9 = -2.1536$ | | | |
| | $d_9 = 0.2084$ | | |
| $r_{10} = \infty$ | | | |
| | $d_{10} = 0.5000$ | $n_6 = 1.51633$ | $\nu_6 = 64.15$ |
| $r_{11} = \infty$ | | | |
| | $d_{11} = 0.4000$ | | |
| $r_{12} = \infty$ | | | |
| | $d_{12} = 1.4000$ | $n_7 = 1.51633$ | $\nu_7 = 64.15$ |
| $r_{13} = \infty$ | | | |

Aspherical coefficient
(1st surface)
  $P = 1.0000$, $B = 0$, $E = 0.16198 \times 10^{-1}$
  $F = -0.13555 \times 10^{-3}$
(6th surface)
  $P = 1.0000$, $B = 0$, $E = 0.18395 \times 10^{-1}$
  $F = -0.51972 \times 10^{-2}$
$|f_1/f| = 1.472$, $I/f_2 = 0.574$, $D/f = 1.861$
$f_2/f = 1.833$, $\theta/0.64$ (rad) $= 1.601$, $D_A = 0.8533$
Incidence angle in 1st filter 32.7°

Embodiment 14

$f = 1$, F/3.946, $2\omega = 120°$

| | | | |
|---|---|---|---|
| $r_1 = 21.7083$ (Aspherical surface) | | | |
| | $d_1 = 0.6811$ | $n_1 = 1.88300$ | $\nu_1 = 40.78$ |
| $r_2 = 0.8528$ | | | |
| | $d_2 = 0.8649$ | | |
| $r_3 = \infty$ | | | |
| | $d_3 = 0.9082$ | $n_2 = 1.52287$ | $\nu_2 = 59.89$ |
| $r_4 = \infty$ (Stop) | | | |
| | $d_4 = 0.1864$ | | |
| $r_5 = 13.6166$ | | | |
| | $d_5 = 1.3061$ | $n_3 = 1.72916$ | $\nu_3 = 54.68$ |
| $r_6 = -2.5071$ | | | |
| | $d_6 = 0.1074$ | | |
| $r_7 = \infty$ | | | |
| | $d_7 = 1.4076$ | $n_4 = 1.52000$ | $\nu_4 = 74.00$ |
| $r_8 = \infty$ | | | |
| | $d_8 = 0.6826$ | | |
| $r_9 = 2.8757$ | | | |
| | $d_9 = 1.7932$ | $n_5 = 1.60311$ | $\nu_5 = 60.70$ |
| $r_{10} = -1.9781$ | | | |
| | $d_{10} = 0.5167$ | $n_6 = 1.84666$ | $\nu_6 = 23.78$ |
| $r_{11} = -3.3410$ (Aspherical surface) | | | |
| | $d_{11} = 0.6811$ | | |
| $r_{12} = \infty$ | | | |
| | $d_{12} = 2.2705$ | $n_7 = 1.51633$ | $\nu_7 = 64.15$ |

-continued $r_{13} = \infty$
Aspherical coefficient
(1st surface)
P = 1.0000, B = 0, E = 0.32789 × 10$^{-1}$
F = −0.49161 × 10$^{-2}$
(11th surface)
P = 1.000, B = 0, E = 0.22862 × 10$^{-1}$
F = −0.22050 × 10$^{-2}$
$|f_1/f| = 0.980$, $1/f_2 = 0.444$
$f_{21}/f_2 = 1.125$, $f_{22}/f_2 = 1.243$
$f_2/f = 2.671$, $\theta/0.64$ (rad) = 1.636, $D_4 = 4.056$
Incidence angle in 1st filter 26.6°

Embodiment 15 f = 1, F/4.042, $2\omega = 120°$

| | | | |
|---|---|---|---|
| $r_1 = 60.9504$ (Aspherical surface) | | | |
| | $d_1 = 0.7005$ | $n_1 = 1.88300$ | $\nu_1 = 40.78$ |
| $r_2 = 0.9640$ | | | |
| | $d_2 = 0.8875$ | | |
| $r_3 = \infty$ | | | |
| | $d_3 = 0.8929$ | $n_2 = 1.52287$ | $\nu_2 = 59.89$ |
| $r_4 = \infty$ (Stop) | | | |
| | $d_4 = 0.2273$ | | |
| $r_5 = 19.0928$ | | | |
| | $d_5 = 1.3545$ | $n_3 = 1.72916$ | $\nu_3 = 54.68$ |
| $r_6 = -2.4303$ | | | |
| | $d_6 = 0.0962$ | | |
| $r_7 = \infty$ | | | |
| | $d_7 = 1.3736$ | $n_4 = 1.52000$ | $\nu_4 = 74.00$ |
| $r_8 = \infty$ | | | |
| | $d_8 = 0.3336$ | | |
| $r_9 = 2.8398$ (Aspherical surface) | | | |
| | $d_9 = 1.5085$ | $n_5 = 1.60311$ | $\nu_5 = 60.70$ |
| $r_{10} = -1.6896$ | | | |
| | $d_{10} = 0.4377$ | $n_6 = 1.84666$ | $\nu_6 = 23.78$ |
| $r_{11} = -3.2673$ | | | |
| | $d_{11} = 0.7074$ | | |
| $r_{12} = \infty$ | | | |
| | $d_{12} = 2.2115$ | $n_7 = 1.51633$ | $\nu_7 = 64.15$ |
| $r_{13} = \infty$ | | | |

Aspherical coefficient
(1st surface)
P = 1.0000, B = 0, E = 0.39178 × 10$^{-1}$
F = −0.57259 × 10$^{-2}$
(9th surface)
P = 1.0000, B = 0, E = −0.25386 × 10$^{-1}$
F = 0.42102 × 10$^{-2}$
$|f_1/f| = 1.115$, $1/f_2 = 0.520$
$f_{21}/f_2 = 1.303$, $f_{22}/f_2 = 1.503$
$f_2/f = 2.230$, $\theta/0.64$ (rad) = 1.636, $D_4 = 2.344$
Incidence angle in 1st filter 29.5°

Embodiment 16 f = 1, F/4.251, $2\omega = 120°$

| | | | |
|---|---|---|---|
| $r_1 = 7.0860$ (Aspherical surface) | | | |
| | $d_1 = 0.6742$ | $n_1 = 1.88300$ | $\nu_1 = 40.78$ |
| $r_2 = 0.7395$ | | | |
| | $d_2 = 0.8285$ | | |
| $r_3 = \infty$ | | | |
| | $d_3 = 0.8699$ | $n_2 = 1.52287$ | $\nu_2 = 59.89$ |
| $r_4 = \infty$ (Stop) | | | |
| | $d_4 = 0.2611$ | | |
| $r_5 = -29.5060$ | | | |
| | $d_5 = 1.3439$ | $n_3 = 1.72916$ | $\nu_3 = 54.68$ |
| $r_6 = -1.7847$ (Aspherical surface) | | | |
| | $d_6 = 0.1810$ | | |
| $r_7 = \infty$ | | | |
| | $d_7 = 1.3484$ | $n_4 = 1.52000$ | $\nu_4 = 74.00$ |
| $r_8 = \infty$ | | | |
| | $d_8 = 0.7682$ | | |
| $r_9 = 3.8053$ | | | |
| | $d_9 = 1.6352$ | $n_5 = 1.60311$ | $\nu_5 = 60.70$ |
| $r_{10} = -1.6747$ | | | |
| | $d_{10} = 0.3262$ | $n_6 = 1.84666$ | $\nu_6 = 23.78$ |
| $r_{11} = -3.2953$ | | | |
| | $d_{11} = 0.5655$ | | |
| $r_{12} = \infty$ | | | |
| | $d_{12} = 2.1748$ | $n_7 = 1.51633$ | $\nu_7 = 64.15$ |
| $r_{13} = \infty$ | | | |

Aspherical coefficient
(1st surface)
P = 1.0000, B = 0, E = 0.24264 × 10$^{-1}$
F = −0.83617 × 10$^{-3}$
(6th surface)
P = 1.0000, B = 0, E = 0.14631 × 10$^{-1}$
F = −0.72865 × 10$^{-2}$
$|f_1/f| = 0.984$, $1/f_2 = 0.456$
$f_{21}/f_2 = 1.026$, $f_{22}/f_2 = 1.605$
$f_2/f = 2.489$, $\theta/0.64$ (rad) = 1.636, $D_4 = 1.038$
Incidence angle in 1st filter 28.2° wherein the reference symbol $r_1, r_2, \ldots$ represent radii of curvature on the surfaces of the respective lens elements, the reference symbols $d_1, d_2, \ldots$ designate thicknesses of the respective lens elements and the airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

The Embodiments 1 through 6 have the compositions illustrated in FIG. 11 through FIG. 16 respectively.

Out of these embodiments, each of the Embodiments 1 through 5 comprises a positive lens component which is arranged in the front lens unit before the aperture stop and designed as a cemented doublet satisfying the condition (3).

Figure 17:
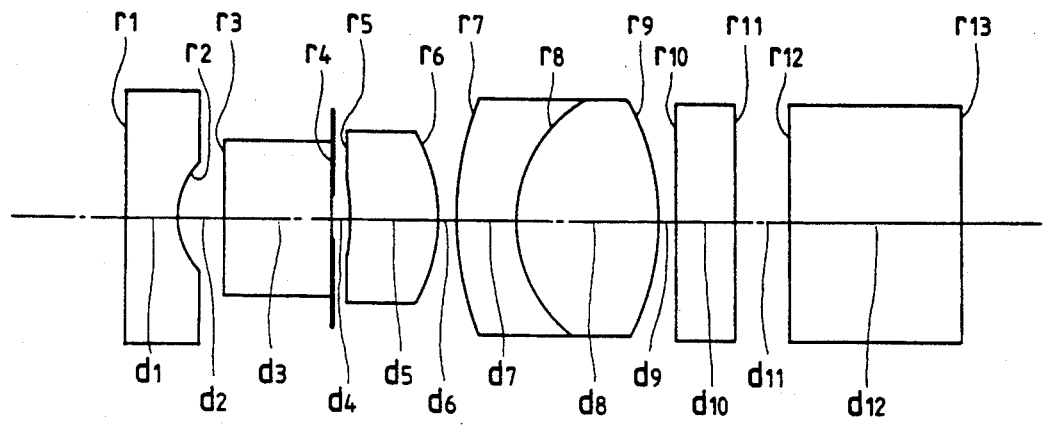
Figure 18:
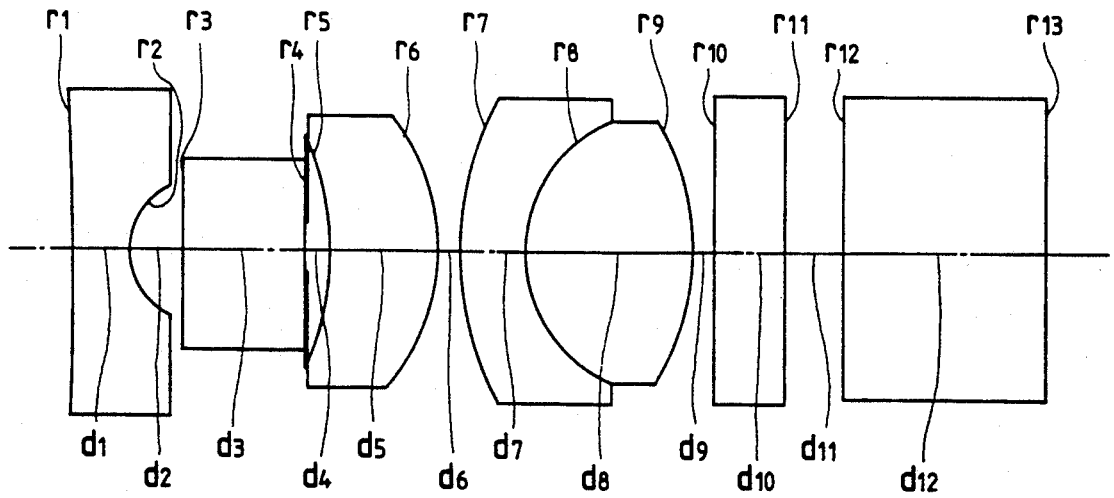

The Embodiments 7 and 8 have the compositions illustrated in FIG. 17 and FIG. 18 respectively wherein an absorption filter for cutting off the infrared rays is arranged immediately before the aperture stop and an interference filter for cutting off laser is arranged after the cemented doublet. The Embodiment 7 and 8 satisfy the following condition (12) in addition to the conditions (10) and (11):

$$1.0 < D/f < 5.0 \tag{12}$$

wherein the reference symbol D represents the optical path length as measured from the image side surface of the cemented doublet to a solid-state image pickup device.

The condition (12) defines the airspace required for arranging the filter arranged after the cemented doublet. If the lower limit of the condition (12) is exceeded while maintaining a short total length of the objective optical system, it will be impossible to reserve the airspace for arranging the filter and each lens surface will have strengthened power, thereby making it difficult to correct aberrations. If the upper limit of the condition (12) is exceeded, the airspace reserved between the optical system and the solid-state image pickup device will be too wide and the total length of the optical system will be prolonged.

The Embodiments 7 and 8 satisfy the conditions (10) through (12). Further, in the Embodiment 7, the offaxial principal ray has an angle of incidence of 25.3° on the front filter and an angle of incidence of 5.6° on the rear filter. Furthermore, when image height on the solid-state image pickup device is taken as 1, height of the offaxial principal ray on the absorption filter used as the infrared cut filter is approximately 0.35. In the Embodiment 8, the offaxial principal ray has an angle of incidence of 28.4° on the front filter and an angle of incidence of 2.5° on the rear filter, and height of the offaxial principal ray on the infrared cut filter is approximately 0.4 when the image height on the solid-state image pickup device is taken as 1.

The Embodiments 7 and 8 are designed so as to satisfy the conditions (10) through (12), and have short total lengths, small angles of incidence on the filters or low heights of rays, and favorably corrected aberrations.

Figure 19:
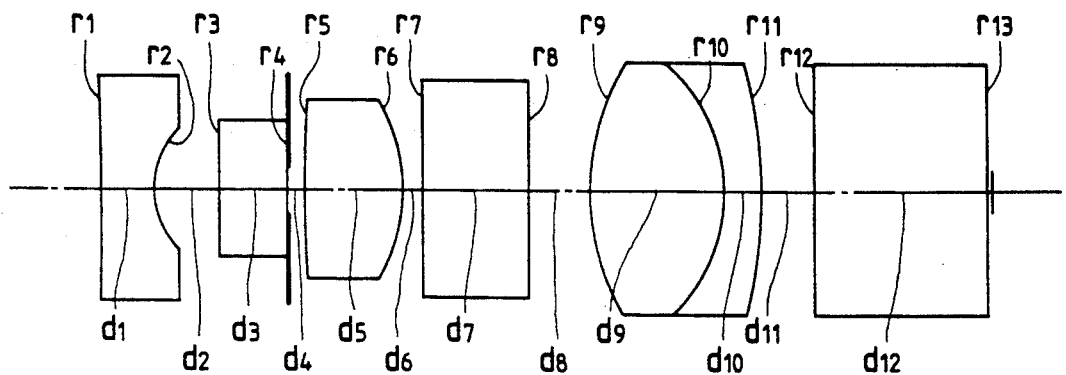
Figure 20:
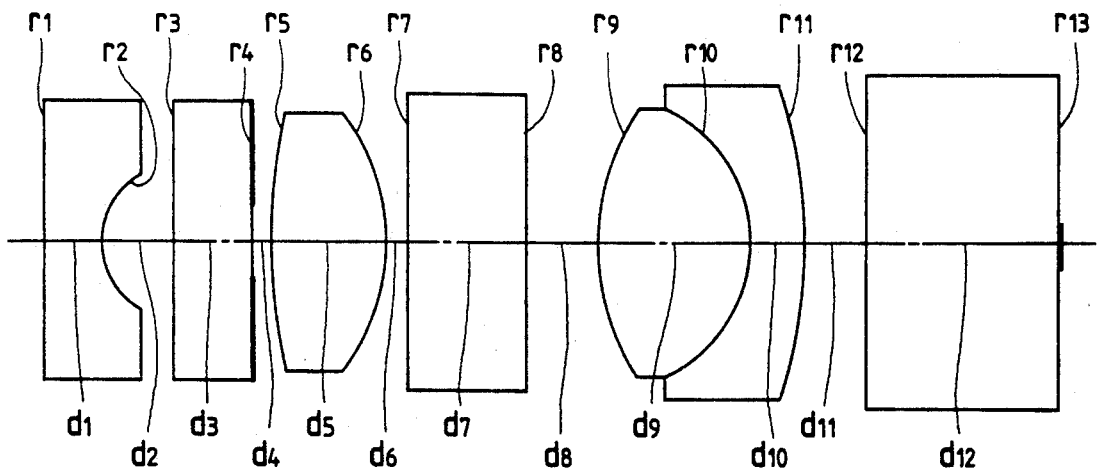

The Embodiments 9 and 10 have the compositions illustrated in FIG. 19 and FIG. 20 respectively, in each of which an interference filter for cutting off laser is arranged immediately before the aperture stop, and an absorption filter for cutting off the infrared rays is arranged between the positive lens component and the cemented doublet.

The Embodiments 9 and 10 satisfy the following conditions (13) and (14) in addition to the conditions (10) and (11):

$$0.5 < f_{21}/f_2 < 3.0 \qquad (13)$$

$$0.5 < f_{22}/f_2 < 5.0 \qquad (14)$$

wherein the reference symbol $f_{21}$ represents the focal length of the positive lens component arranged immediately after the aperture stop and the reference symbol $f_{22}$ designates the focal length of the cemented doublet.

The condition (13) is required for lowering the heights of the rays incident on the filter arranged after the aperture stop and the cemented doublet. The airspace reserved between the positive lens component arranged immediately after the aperture stop and the cemented doublet is defined by satisfying the conditions (13) and (14).

If the upper limit of the condition (13) is exceeded, the rays incident on the filter arranged after the aperture stop and the cemented doublet are enhanced, thereby making it necessary to enlarge the diameter of the lens system and making the lens system unsuited for use as an objective lens system for endoscopes. Further, ray incident on the cemented doublet is enhanced, thereby making it difficult to correct coma.

If the lower limit of the condition (14) is exceeded, the positive lens component arranged immediately after the aperture stop will have too strong power and produce spherical aberration.

In order to lower the height of the rays incident on the filter arranged after the aperture stop and the cemented doublet, and to make the optical system compact, it is desirable to design the objective optical system so as to satisfy the conditions (13) and (14).

In the Embodiment 9, the offaxial principal ray has an angle of incidence of 21.7° on the filter arranged before the aperture stop and an angle of incidence of 13.7° on the filter arranged after the aperture stop, and the image height on the infrared cut filter is approximately 0.55 when the image height on the solid-state image pickup device is taken as 1.

In the Embodiment 10, the offaxial principal ray has an angle of incidence of 22.3° on the front filter and an angle of incidence of 14.9° on the rear filter, and height of the offaxial principal ray on the infrared cut filter is approximately 0.6 when the height of the offaxial ray on the solid-state image pickup device is taken as 1.

As is understood from the foregoing description, the Embodiments 9 and 10 which are designed so as to satisfy the conditions (10), (11), (13) and (14) are optical systems having short total lengths, small angles of incidence on the filters or low heights of rays, and favorably corrected aberrations.

Figure 21:
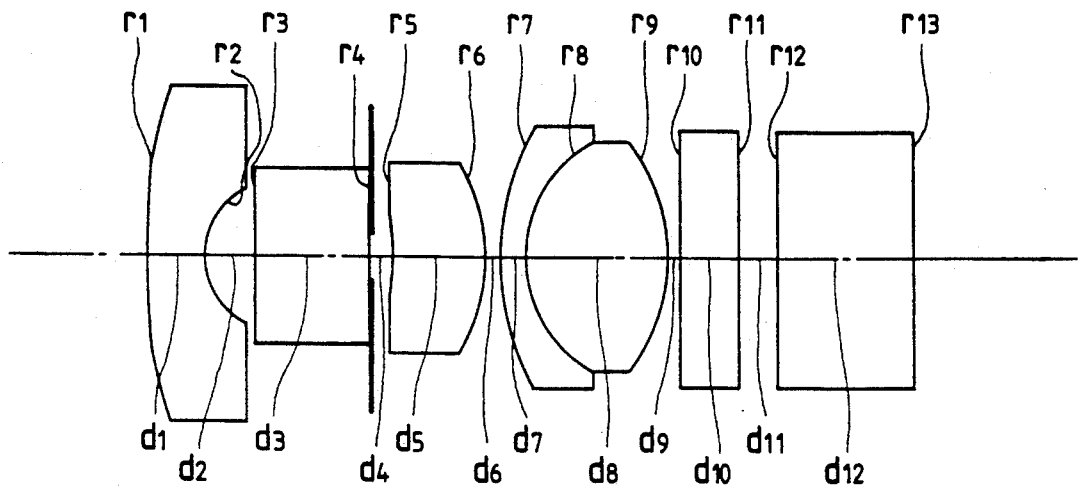
Figure 22:
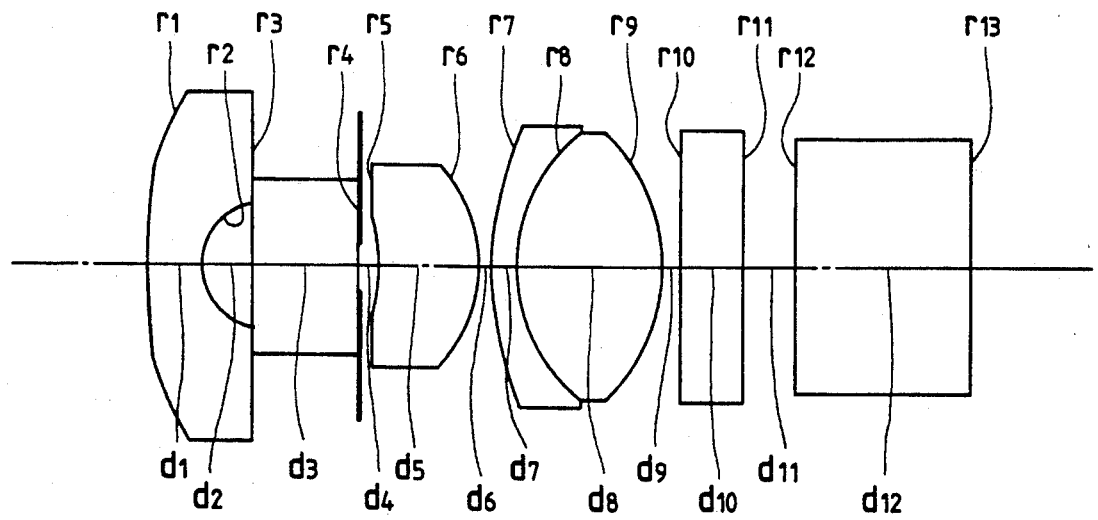
Figure 23:
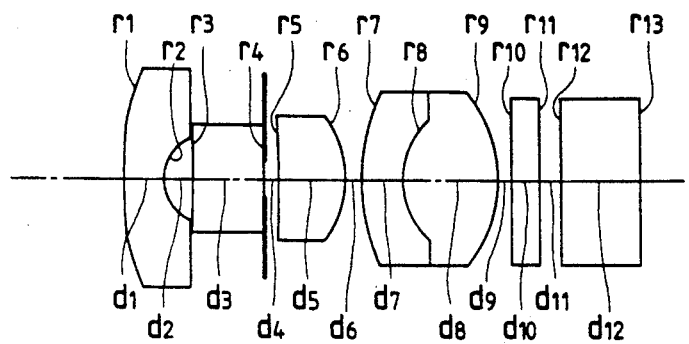
Figure 24:
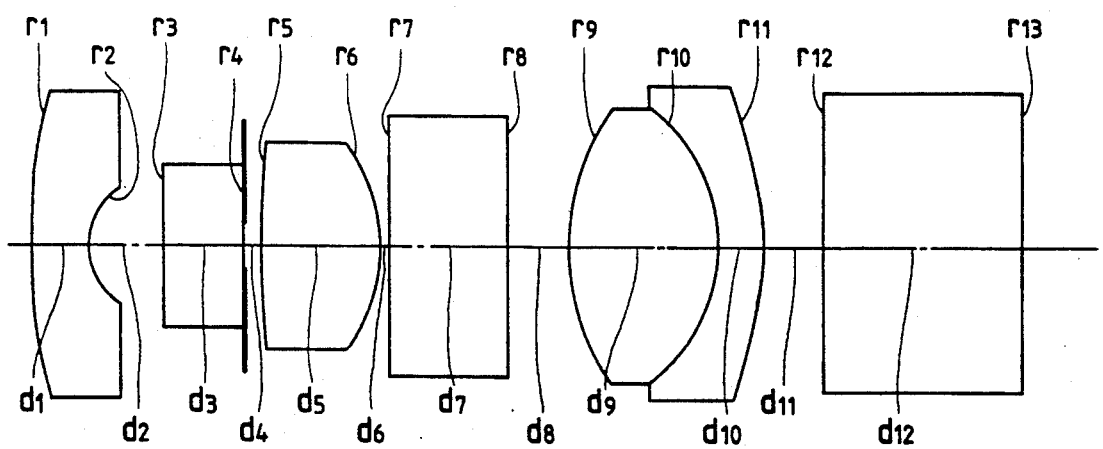
Figure 25:
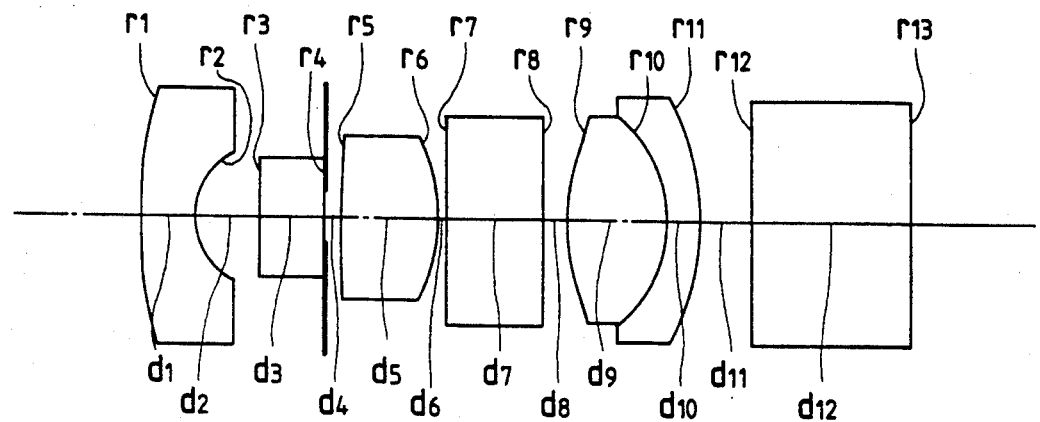
Figure 26:
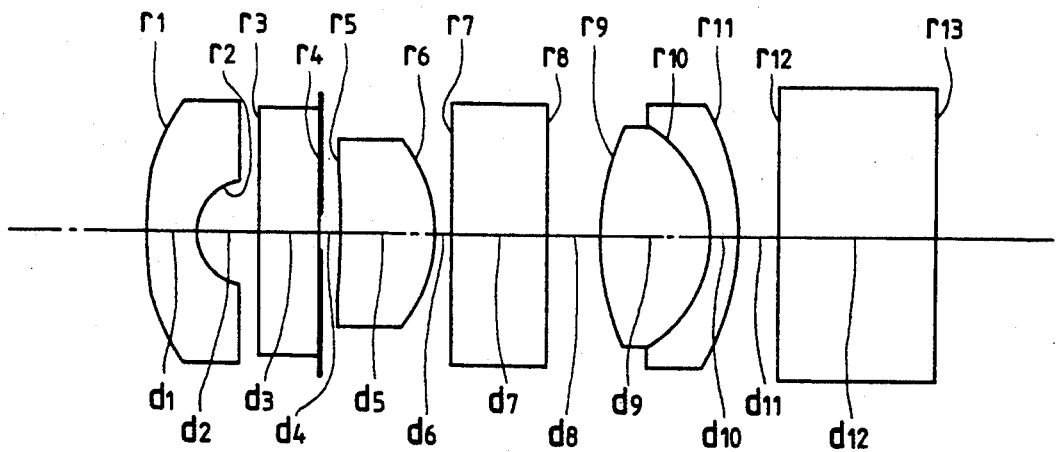
Figure 27:
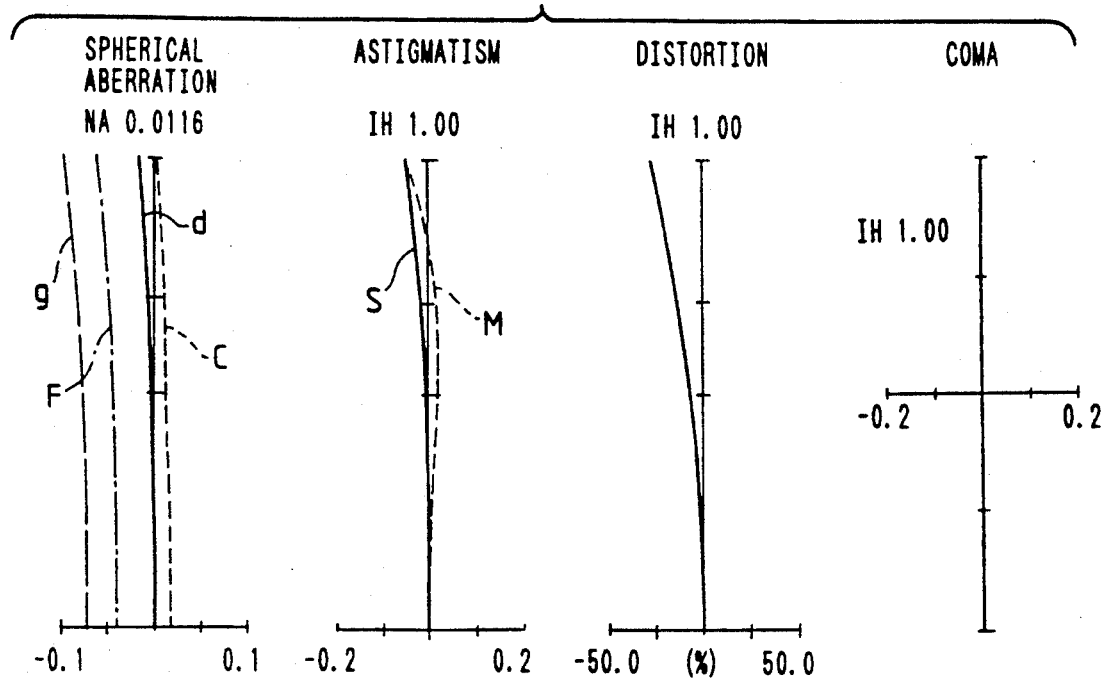
FIG. 27 through FIG. 42 show curves illustrating aberration characteristics of the Embodiments 1 through 16 of the present invention.
Figure 28:
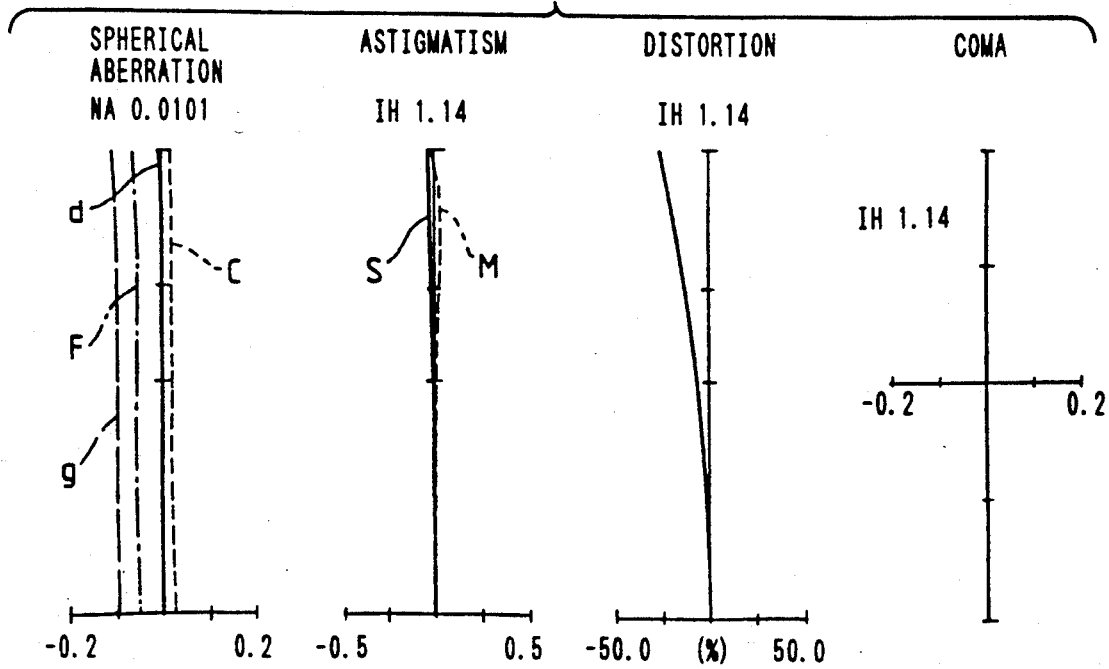
Figure 29:
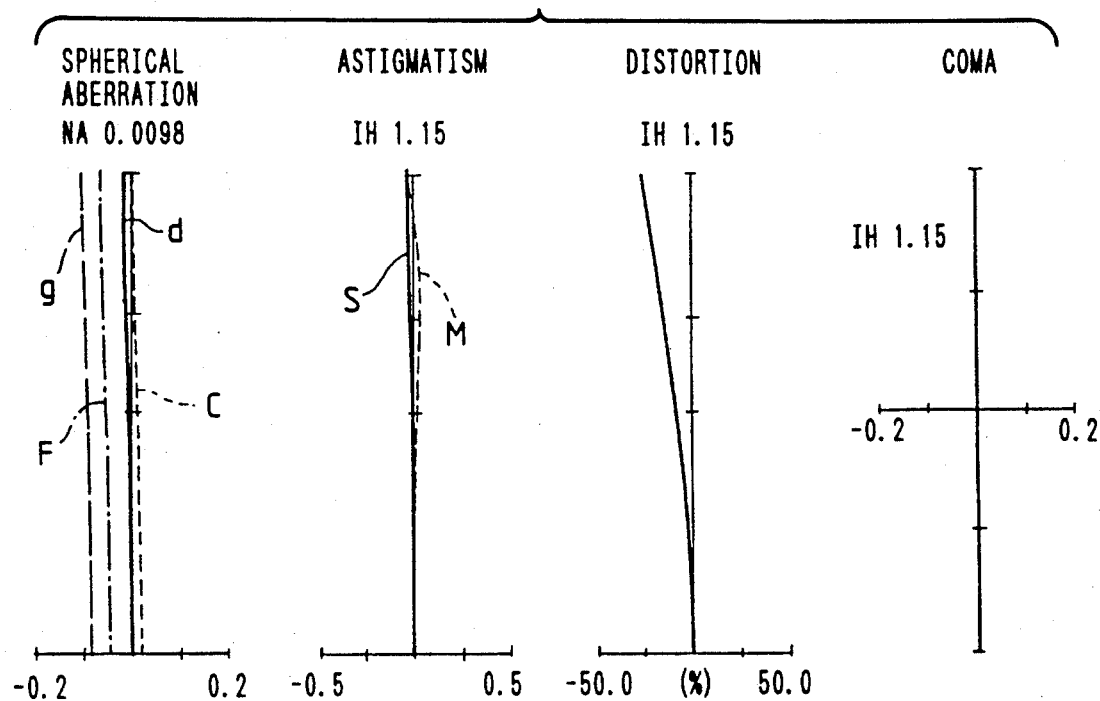
Figure 30:
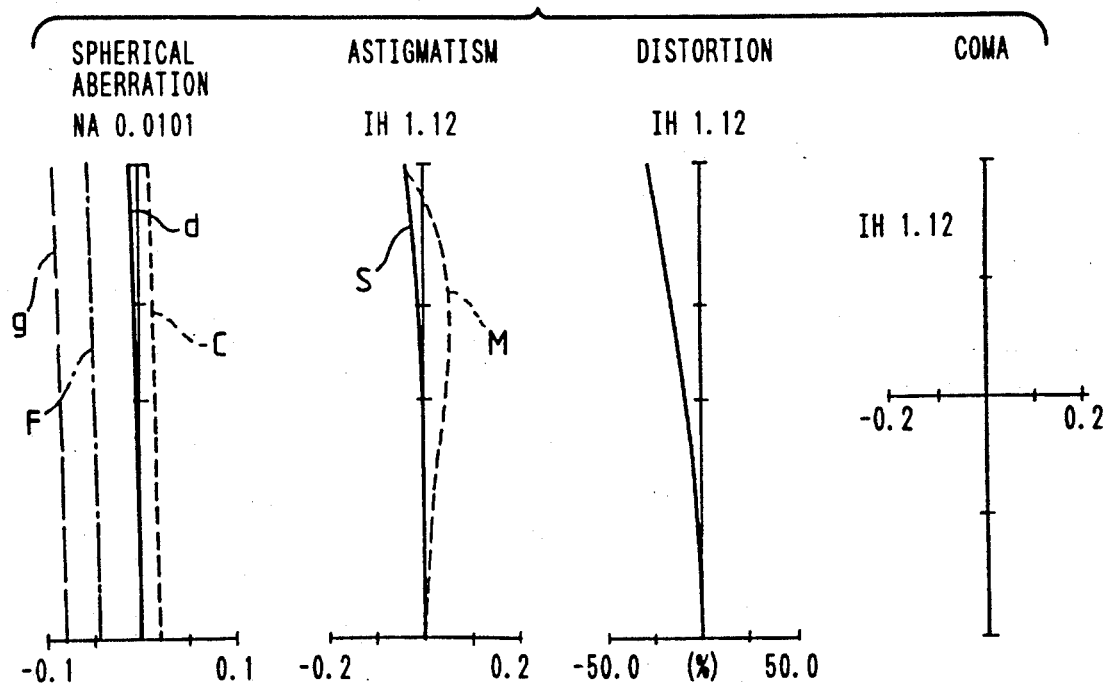
Figure 31:
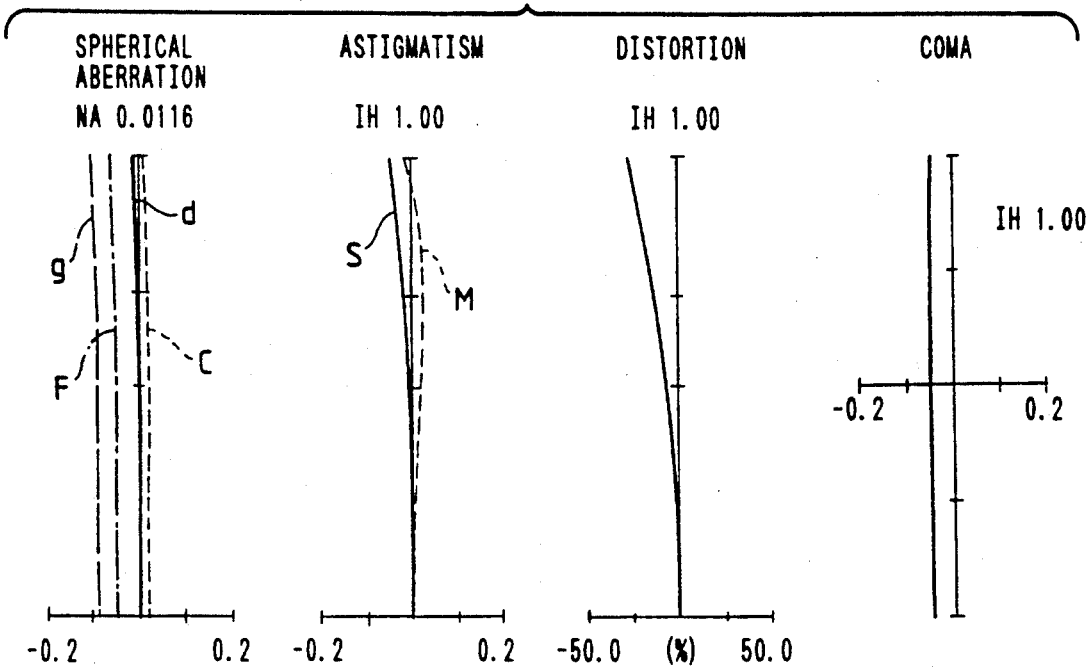
Figure 32:
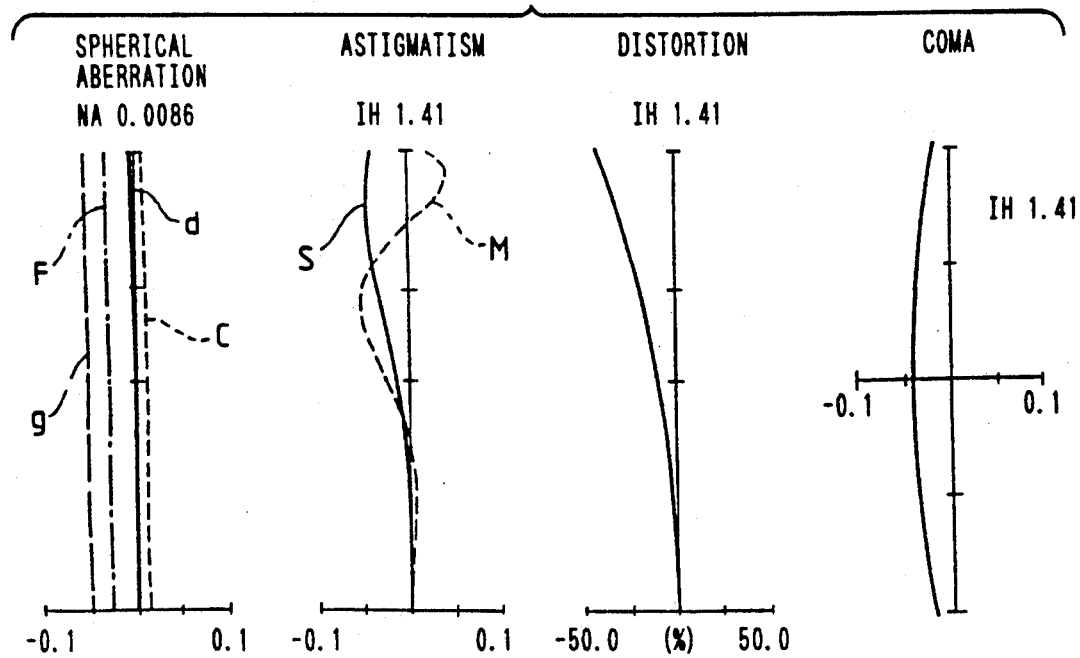
Figure 33:
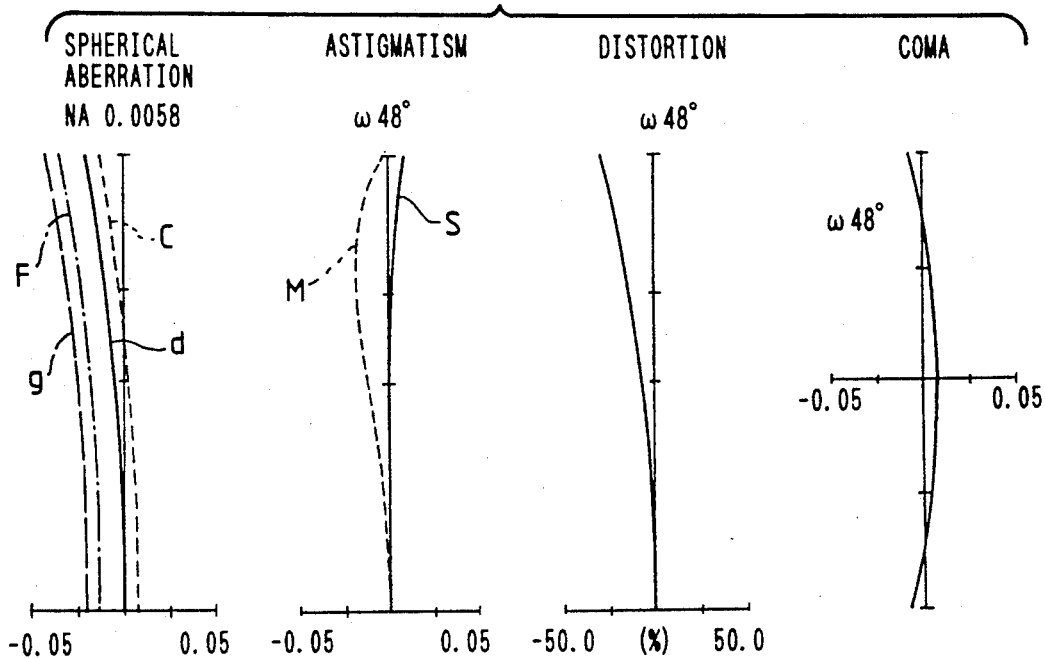
Figure 34:
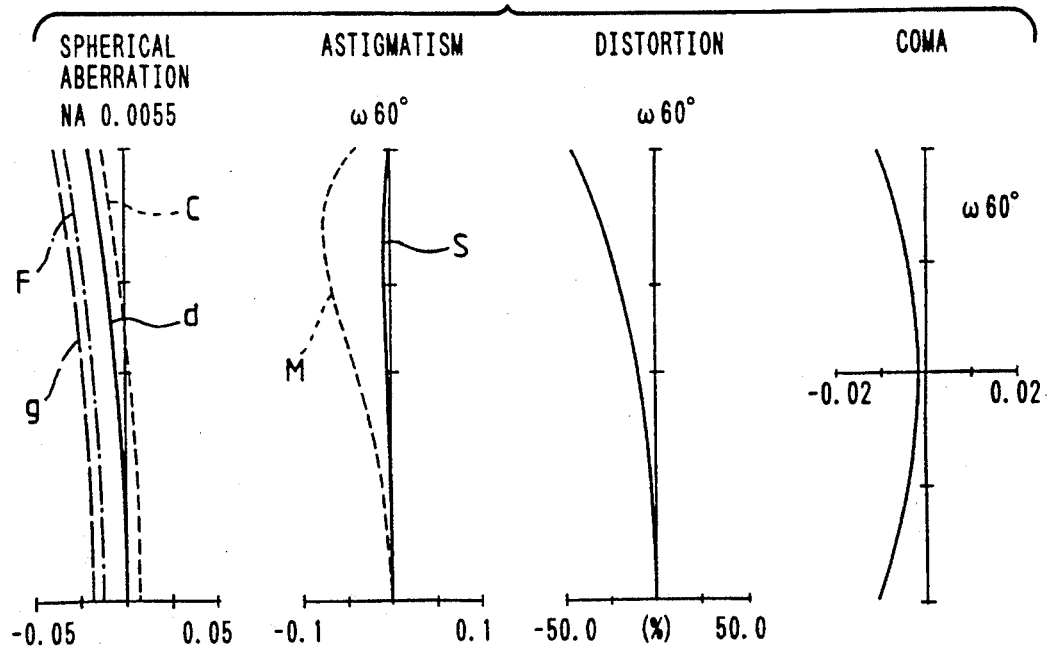
Figure 35:
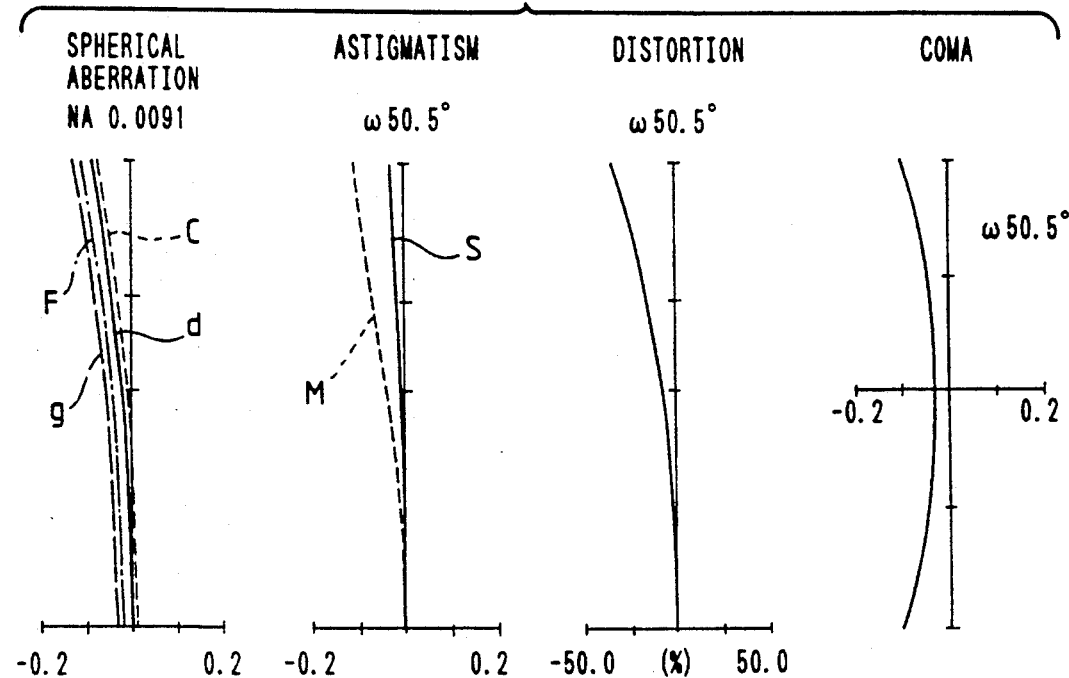
Figure 36:
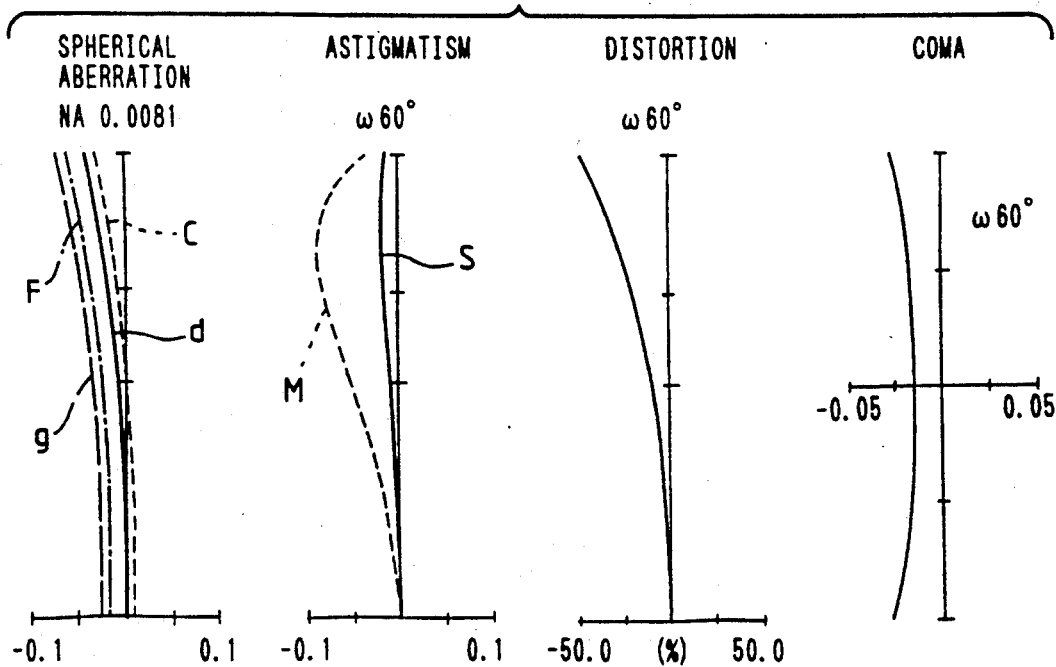
Figure 37:
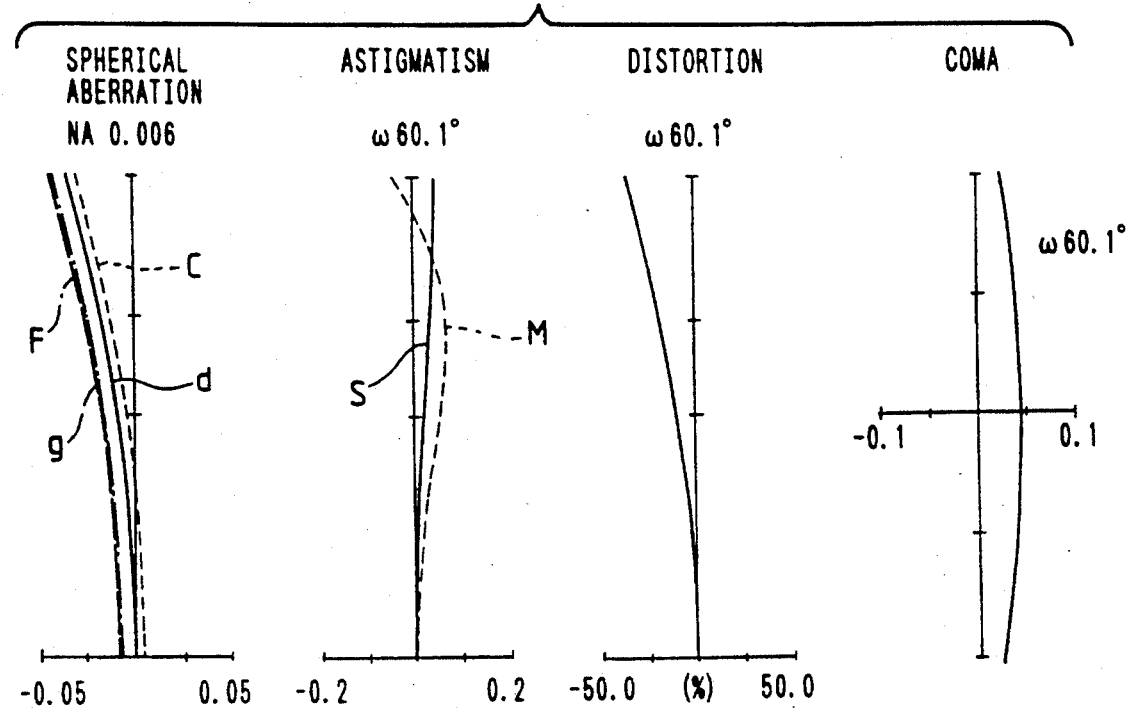
Figure 38:
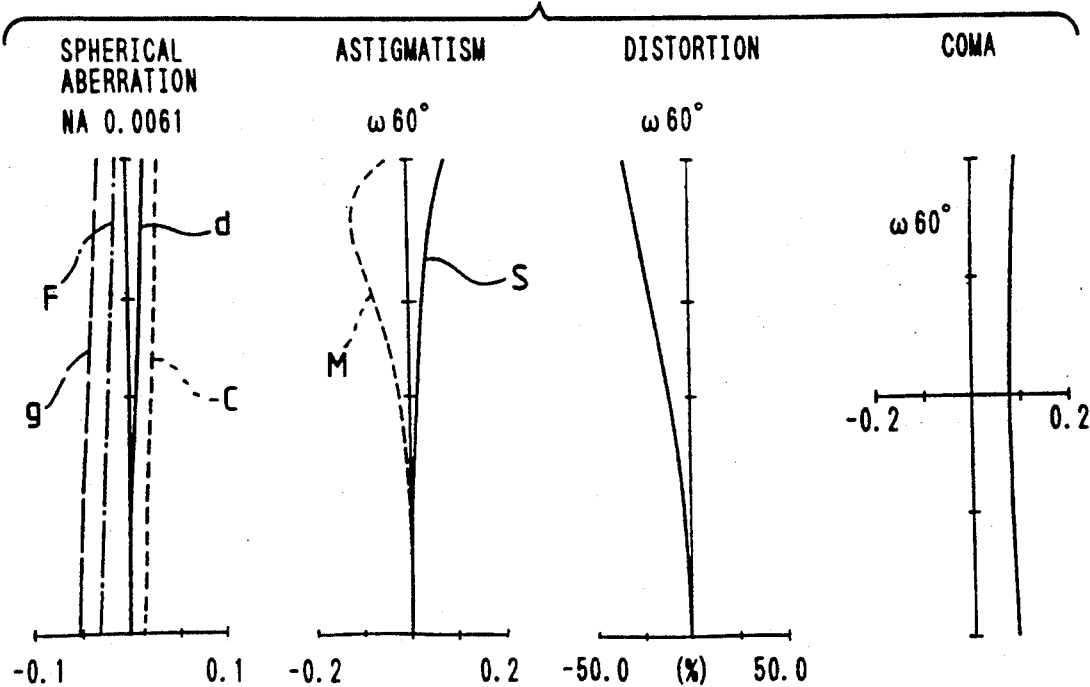
Figure 39:
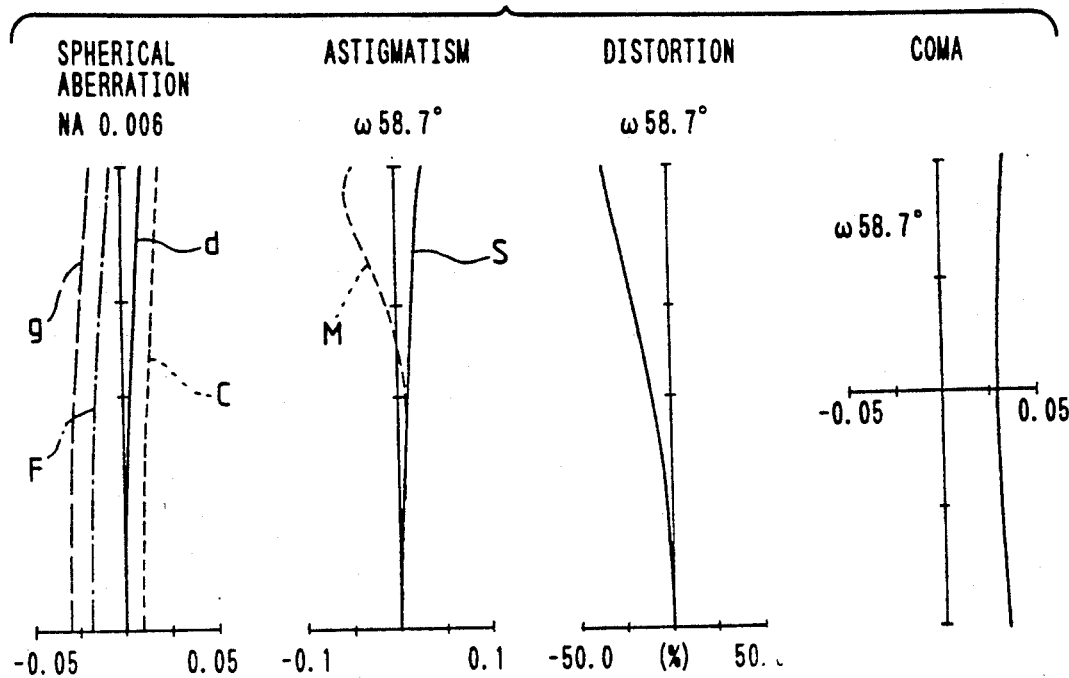
Figure 40:
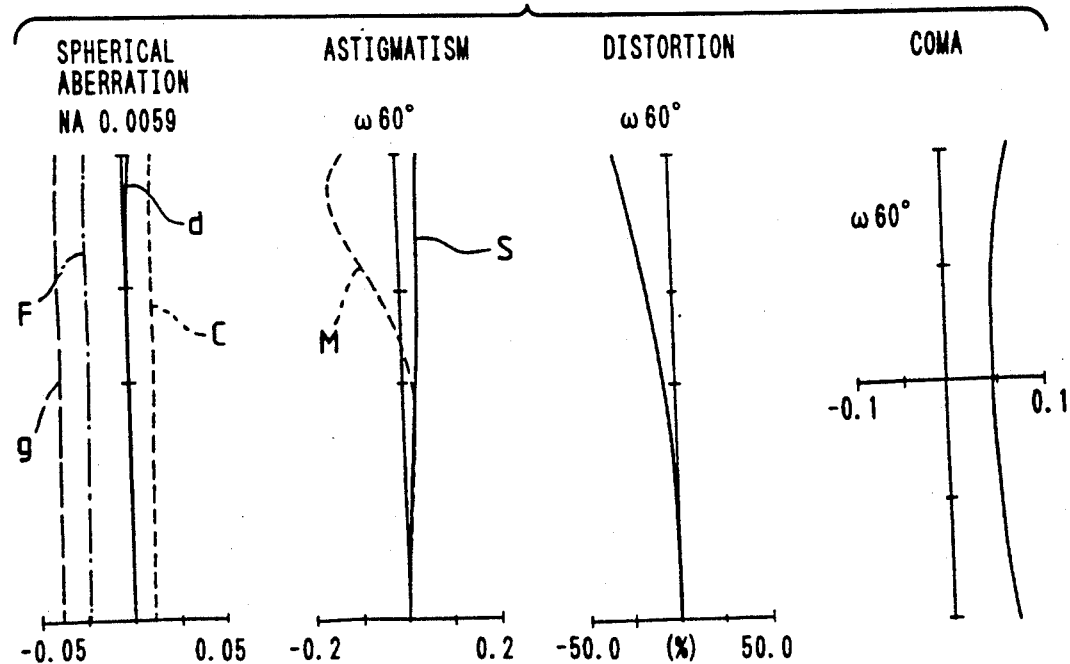
Figure 41:
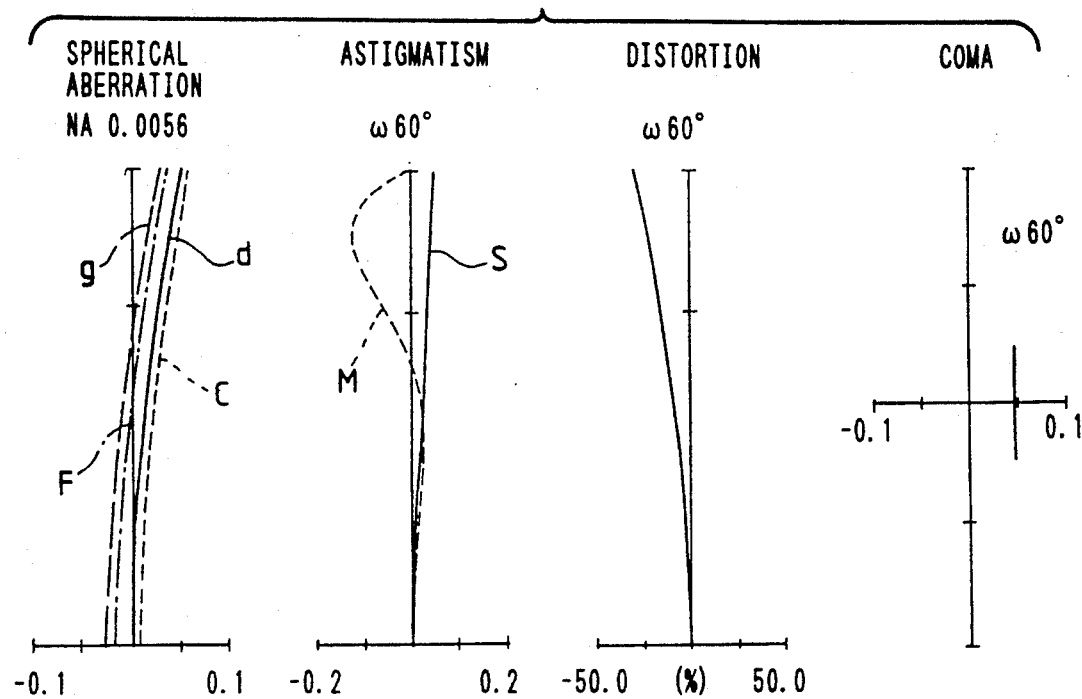
Figure 42:
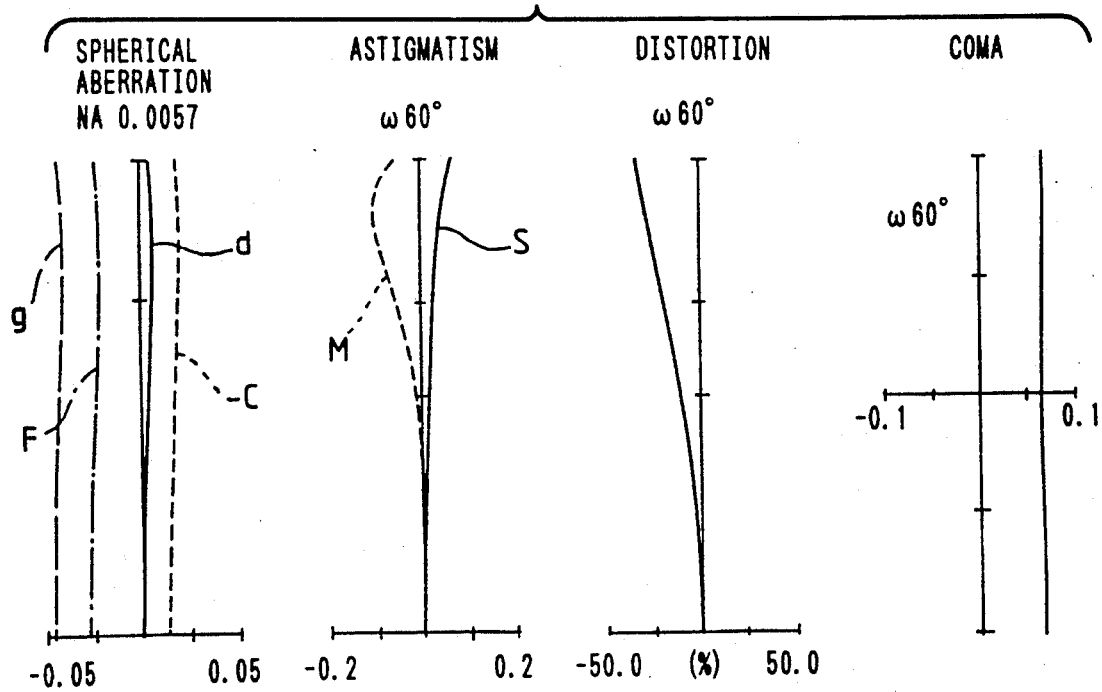

The Embodiments 11, 12 and 13 have the compositions illustrated in FIG. 21 through FIG. 23, are of the type similar to the Embodiments 9 and 10, and use two aspherical surfaces respectively.

Figure 43:
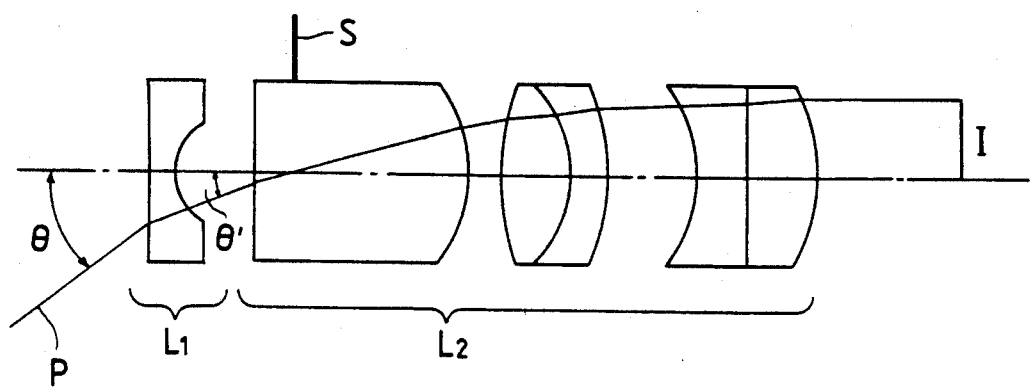
FIG. 43 shows a sectional view illustrating refracted condition of a ray in the objective optical system for endoscopes according to the present invention.

The Embodiments 7 through 10 are of the type consisting only of spherical lens elements. In the objective optical system of this type or the optical system shown in FIG. 43, comparison between inclination angle $\theta$ relative to the optical axis of the principal ray P which is incident on the lens component $L_1$ arranged on the object side of the aperture stop and inclination angle $\theta'$ relative to the optical axis of the principal ray P which emerges from the lens component $L_1$ and is incident on the lens unit $L_2$ (comprising at least one positive lens component) located on the image side of the aperture stop, will clarify that $\theta'$ is prettily smaller than $\theta$. This is apparent also from the fact that the lens component $L_1$ has a negative function for widening the field angle.

Figure 44:
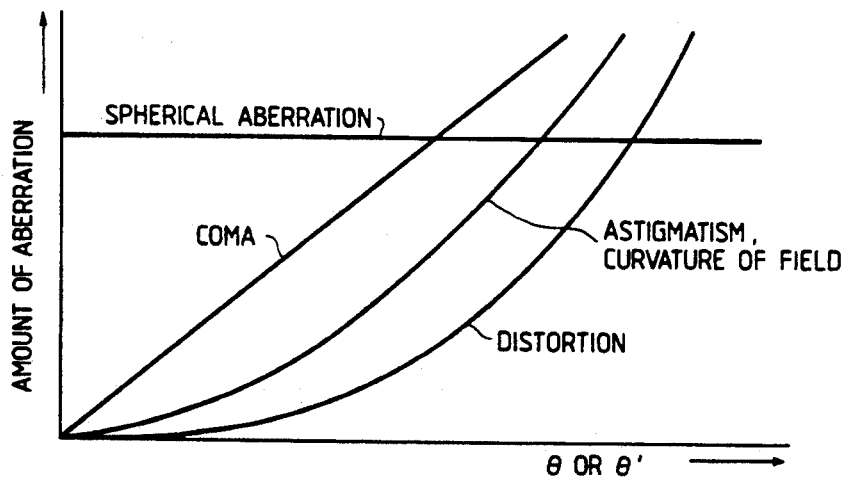
FIG. 44 shows curves illustrating relationship between inclination angle of the principal ray and amounts of aberrations.

In the optical system having the above-described characteristic, it is known that there establishes between $\theta'$ and aberrations the relationship described below. When $\theta'$ is small, curvature of field, astigmatism and distortion are produced in small amounts, whereas spherical aberration is produced in a relatively large amount. FIG. 44 illustrates this relationship. Accordingly, it is sufficient that spherical aberration and coma are corrected when the pupil located between the lens unit $L_2$ having positive refractive power and the lens component $L_1$ having positive refractive power is considered as an object, and that the sine condition is satisfied.

The sine condition is described as follows:

When image height is represented by I, the focal length of the lens unit $L_2$ is designated by $f_2$ and the inclination angle of the principal ray P incident on the lens unit $L_2$ relative to the optical axis is denoted by $\theta'$, the following formula establishes in a telecentric optical system wherein the principal ray P is incident perpendicularly on the image surface I:

$$I = f_2 \sin \theta'$$

When the lens component $L_1$ consists only of spherical lens elements as shown in FIG. 43, departure from the sine condition is little even before the aperture stop S. Accordingly, the following formula of the sine condition establishes:

$$I = f \sin \theta$$

wherein the reference symbol f represents the focal length of the objective optical system as a whole and the reference symbol $\theta$ designates the inclination angle of the principal ray P incident on the lens component $L_1$ relative to the optical axis.

Under the restrictions imposed on outside diameters of lens systems and numbers of lens elements, the sine condition is nearly satisfied by almost all of the objective optical systems for endoscopes which are used currently.

In the optical systems satisfying the sine condition, distortion increases abruptly as $\theta$ is widened as illustrated in FIG. 44. Relationship between distortion and $\theta$ can be expressed by the following formula:

$$DT(\theta) = \cos \theta - 1$$

wherein the reference symbol DT represents a value given by the following formula:

$DT=(y-y_0)/y_0\times 100\ (\%)$ wherein the reference symbol y represents size of an image deformed due to distortion and the reference symbol $y_0$ designates size of an ideal image calculated by the paraxial theory.

In an ordinary objective optical system for endoscopes to which the formula of the sine condition and formula of distortion $DT(\theta)$ apply, negative distortion (barrel-type distortion) increases abruptly as $\theta$ is enlarged.

Values of $DT(\theta)$ corresponding to various field angles $2\theta$ in an objective optical system satisfying $I=f\sin\theta$ are tabulated below:

| Field angle $2\theta$ | 80° | 100° | 120° | 140° |
|---|---|---|---|---|
| Distortion $DT(\theta)$ | −23 | −36 | −50 | −66 (%) |

As is understood from the foregoing description, the conventional objective optical systems produce remarkable negative distortion though the optical systems satisfy the sine condition for meeting the essential requirements for objective optical systems for endoscopes, or the optical systems have wide field angles, telecentric compositions, favorably corrected aberrations and compact designs.

When an object is observed through the objective optical systems for endoscopes which produce distortion as described above, the marginal portions of images are distorted and smaller than the central portions. Accordingly, such optical systems do not permit accurate measurements or analyses of forms of industrial products when the optical systems are applied to industrial inspections. Further such objective optical system may be causes of erroneous diagnoses when applied in the medical field.

Figure 45:
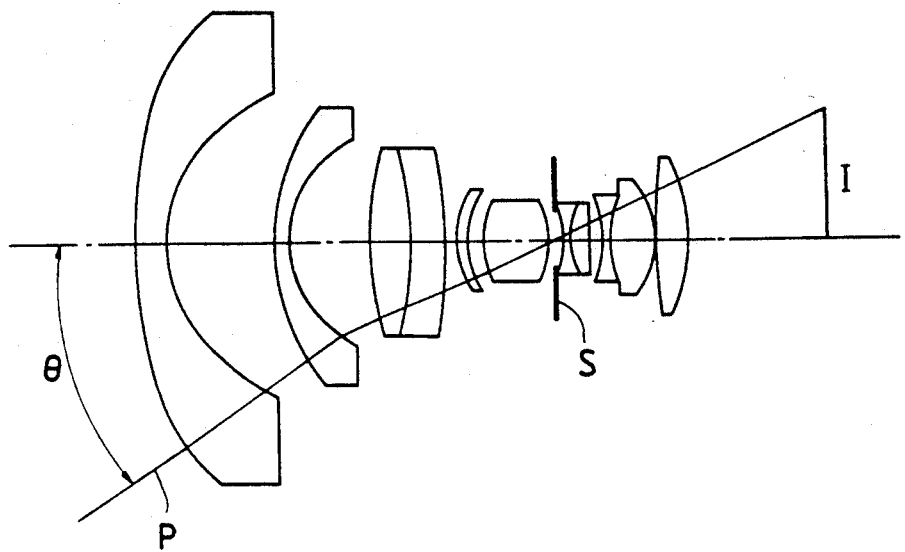
FIG. 45 shows a sectional view illustrating an example of wide-angle camera lens system.

Furthermore, the following formula establishes for the optical systems which produce little distortion, for example, the wide-angle photographic camera lens system illustrated in FIG. 45:

$I=f\tan\theta$

In an optical system for which the above-mentioned formula establishes, light amount on the image surface is reduced at a rate of $\cos^4\theta$ as value of $\theta$ increases. In case of the conventional objective optical system for endoscopes which produces the negative distortion, however, image size is reduced from the central portion toward the marginal portion, thereby cancelling the reduction of light amount at the rate of $\cos^4\theta$. Accordingly, brightness is kept constant regardless of enlargement of $\theta$ in the optical system satisfying $I=f\sin\theta$.

The objective optical system for endoscopes satisfying the sine condition has a characteristic that brightness is constant over the entire range of an image from the center to the marginal portion thereof. However, this optical system is undesirable in that it has distortion. In the optical system satisfying $I=f\sin\theta$, it is therefore necessary to correct the distortion to the level similar to that produced in an optical system satisfying the relationship of $I=f\theta$.

Distortion $DT(\theta)$ corresponding to various values of $2\theta$ of the optical system satisfying $I=f\theta$ are tabulated below:

| Field angle $2\theta$ | 80° | 100° | 120° | 140° |
|---|---|---|---|---|
| Distortion $DT(\theta)$ | −17 | −27 | −39.5 | −55.5 (%) |

Figure 46:
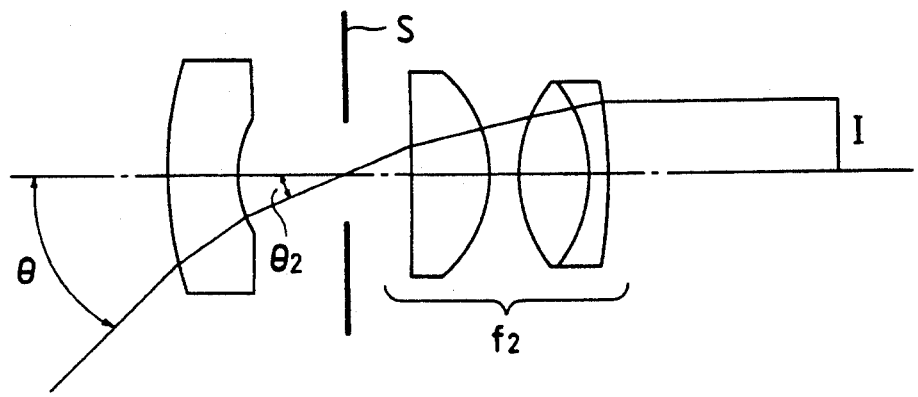
FIG. 46 shows a sectional view illustrating refracted condition of the principal ray in the optical systems preferred as the Embodiments 5 through 10 of the present invention.

The Embodiments 11 through 16 are objective optical systems for endoscopes which are designed so as to have distortion corrected to levels sufficient for practical use regardless of large field angles, in addition to the merits of the Embodiments 7 through 10, and obtain image brightness substantially constant from the center to the marginal portion of images. The Embodiments 11 through 16 use aspherical surfaces for obtaining the above-described merits. Speaking concretely, the Embodiments 11 through 16 use the aspherical surfaces in the optical system shown in FIG. 46 so as to satisfy the following formulae (iv) and (v):

$$I=f_2\sin\theta_2 \quad (iv)$$

$$I=f\theta_2 \quad (v)$$

The formula (iv) is a condition required for correcting spherical aberration, coma, etc., and applies to the rear lens unit arranged after the aperture stop.

Accordingly, distortion is produced in the rear lens units of the Embodiments 11 through 16 as $\theta_2$ is enlarged, but the distortion is not produced so remarkably since $\theta_2$ has small values. Further, the optical system satisfying the formula (iv) provides brightness which is constant from the center of an image to the marginal portion thereof regardless of enlargement of $\theta_2$.

The formula (v) applies to an optical system which satisfies $I=f\theta$ and produces little distortion.

The objective optical systems preferred as the Embodiments 11 through 16 are adapted so as to correct distortion to a level sufficient for practical use and provide images having constant brightness from the center to the marginal portion thereof by designing an optical system having a front negative lens unit which is arranged after the pupil position S and satisfies $I=f\sin\theta_1$ so as to satisfy $I=f\theta$ through use of aspherical surfaces without departing from the sine condition $I=f_2\sin\theta_2$.

In addition, the aspherical surfaces have shapes which are expressed by the above-mentioned formula (i).

The Embodiments 11 through 16 satisfy the following conditions (15) in addition to the conditions (10) and (11):

$$f_2/f>\theta(rad)/0.64 \quad (15)$$

wherein the reference symbol $\theta$ represents the half field angles of the objective optical systems for endoscopes.

The condition (15) defines the angle of the ray incident on the filter arranged immediately before the aperture stop when the aspherical surfaces are arranged in the objective optical systems for correction of distortion.

If $f_2/f$ is smaller than $\theta(rad)/0.64$ in the condition (15), the ray incident on said filter will undesirably have a large angle of incidence.

The Embodiments 11 through 13 satisfy the conditions (10), (11), (12) and (15), whereas the Embodiments 14 through 16 satisfy the conditions (10), (11), (13) and (14). All of these embodiments have short total lengths, small angles of incidence on the filters, distortion corrected to levels sufficient for practical use and provide brightness constant from the centers to the marginal portions of images.

The present invention has succeeded in providing an objective optical system for endoscopes which has a compact size, a wide field angle and favorably corrected distortion by adequately arranging aspherical surfaces. Further, the present invention makes it possible to lower height of the ray incident on the filter relative to the outside diameter of the filter, thereby providing an objective optical system for endoscopes having high resolution.

The objective optical system according to the present invention is designed for use in distal ends of endoscopes, and owing to the characteristics described above, contributes to more compact designs of distal ends of endoscopes and improvement of qualities of images formed by optical systems for endoscopes.

We claim:

1. An imaging optical system for endoscopes comprising:
    an objective lens system comprising a front lens unit consisting of a lens component having negative refractive power and a cemented lens component having positive refractive power, an aperture stop and a rear lens unit including only one lens component, said one lens component being a cemented lens component having a positive refractive power,
    an electronic image pickup means for receiving images formed by said objective lens system, and
    a filter for eliminating infrared light and a properly limiting spectral sensitivity of said electronic image pickup means,
    wherein each of said front unit and said rear lens unit including at least one aspherical surface, said front lens unit satisfying one of the following conditions (A) and (B), said rear lens unit satisfying one of the following conditions (C) and (D), and said objective lens system satisfying the following condition (E):
    (A) the front lens unit includes, as an object side surface, an aspherical surface which has a shape including portions having curvature that is progressively enhanced as the portions are farther from the optical axis of said objective lens system;
    (B) the front lens unit includes, as an image side surface, an aspherical surface which has a shape including portions having curvature that is progressively lowered as the portions are farther from the optical axis of said objective lens system;
    (C) the rear lens unit includes, as an object side surface, an aspherical surface which has a shape including portions having curvature that is progressively lowered as the portions are farther from the optical axis of said objective lens system;
    (D) the rear lens unit includes, as an image side surface, an aspherical surface which has a shape including portions having curvature that is progressively enhanced as the portions are farther away from the optical axis of the objective lens system; and
    (E) $0.2f < D_A < 8f$
    wherein the reference symbol $D_A$ represents an optical path length as measured from the aperture stop to the aspherical surface disposed in said rear lens unit.

2. An objective optical system for endoscopes according to claim 1 which said aspherical surface is expressed by the formula given below and satisfies the following conditions:

$$x = \frac{Cy^2}{1 + \sqrt{1 - pC^2y^2}} + By^2 + Ey^4 + Fy^6 + Gy^8 + \ldots$$

$$0.0006/f^3 < E < 0.6/f^3$$
$$0.0001/f^5 < F < 0.1/f^5$$

wherein the reference symbols x and y represent coordinates values when the optical axis is taken as the abscissa, the direction toward the image is taken as positive, the intersection between the optical axis and the aspherical surface is taken as the origin, and the direction perpendicular to the abscissa is taken as the ordinate, the reference symbol C designates the inverse number of the radius of curvature of the circle in contact with the aspherical surface in the vicinity of the optical axis, the reference symbol p denotes the conical constant, and the reference symbols B, E, F, G, ... represent the aspherical surface coefficients of the second order, fourth order, sixth order and eighth order respectively.

3. An objective optical system for endoscopes according to claim 1 wherein said aspherical surfaces arranged in the front lens unit satisfies the following conditions:

$$-13 < A_2/(A_R + S_R) < -0.03$$

$$-0.2 < A_R < 0.2$$

wherein the reference symbol $S_R$ represents the total sum of the coefficients of coma of the third order to be produced by the reference spheres for the aspherical surfaces, the reference symbol $A_R$ designates the total sum of the coefficients of coma to be produced due to the departure of the aspherical surfaces from the reference spheres therefor and the reference symbol $A_2$ denotes the total sum of the coefficients of coma of the third order to be produced by the surfaces having negative refractive powers in the front lens unit.

4. An endoscope equipped with an objective optical system in the distal end thereof, said objective optical system consisting of, in the order from the object side,
    a negative lens component,
    an infrared light cut filter,
    an aperture stop, and
    a positive lens unit comprising at least one positive lens component.

5. An endoscope according to claim 4 satisfying the following condition (10):

$$0.3 < |f_1/f| < 4.0 \quad (10)$$

wherein the reference symbol $f_1$ represents the focal length of said negative lens unit and the reference symbol f designates the focal length of said optical system as a whole.

6. An endoscope according to claim 4 or 5 wherein another filter is arranged on the image side of the lens component arranged in said positive lens unit at a location nearest said aperture stop.

7. An endoscope according to claim 6 satisfying the following condition (11):

$I/f_2 < 0.64$     (11)

wherein the reference symbol $f_2$ represents the focal length of the rear lens unit and the reference symbol I designates the maximum image height.

8. An endoscope according to claim 7 comprising a solid-state image pickup device on the exit side of said objective optical system and satisfying the following condition (12):

$1.0 < D/f < 5.0$     (12)

wherein the reference symbol D represents the optical path length as measured from the extremely image side surface of the objective optical system to the solid-state image pickup device.

9. An endoscope according to claim 7 wherein said objective optical system satisfies the following conditions (13) and (14):

$0.5 < f_{21}/f_2 < 3.0$     (13)

$0.5 < f_{22}/f_2 < 5.0$     (14)

wherein the reference symbol $f_{21}$ represents the focal length of the lens element arranged on the extremely object side in said positive lens unit and the reference symbol $f_{22}$ designates the total focal length of the lens components arranged on the image side of said another filter.

10. An endoscope according to claim 7 comprising at least one aspherical surface in said objective optical system satisfying the following condition (15):

$f_2/f < \theta/0.64$     (15)

wherein reference symbol f represents the focal length of the objective optical system as a whole, reference symbol $f_2$ designates the focal length of the rear lens unit and reference symbol $\theta$ denotes the half field angle of the objective optical system.

11. An endoscope according to claim 8 comprising at least one aspherical surface in said objective optical system satisfying the following condition (15):

$f_2/f < \theta/0.64$     (15)

wherein reference symbol f represents the focal length of the objective optical system as a whole, reference symbol $f_2$ designates the focal length of the rear lens unit and reference symbol $\theta$ denotes the half field angle of the objective optical system.

12. An endoscope according to claim 9 comprising at least one aspherical surface in said objective optical system satisfying the following condition (15):

$f_2/f < \theta/0.64$     (15)

wherein reference symbol f represents the focal length of the objective optical system as a whole, reference symbol $f_2$ designates the focal length of the rear lens unit and reference symbol $\theta$ denotes the half field angle of the objective optical system.

13. An imaging optical system for endoscopes comprising:

an objective lens system comprising a front lens unit consisting of a lens component having negative refractive power and a lens component having positive refractive power, an aperture stop and a rear lens unit consisting of a lens component having positive refractive power and a cemented lens component having a positive refractive power, an electronic image pickup means for receiving images formed by said objective lens system, and a filter for eliminating infrared light and properly limiting spectral sensitivity of said electronic image pickup means, wherein each of said front lens unit and said rear lens unit includes at least one aspherical surface, said front lens unit satisfying one of the following conditions (A) and (B), said rear lens unit satisfying one of the following conditions (C) and (D), and said objective lens system satisfying the following condition (E):

(A) the front lens unit includes, as an object side surface, an aspherical surface which has a shape including portions having curvature that is progressively enhanced as the portions are farther from the optical axis of said objective lens system;

(B) the front lens unit includes, as an image side surface, an aspherical surface which has a shape including portions having curvature that is progressively lowered as the portions are farther from the optical axis of said objective lens system;

(C) the rear lens unit includes, as an object side surface, an aspherical surface which has a shape including portions having curvature that is progressively lowered as the portions are farther from the optical axis of said objective lens system;

(D) the rear lens unit includes, as an image side surface, an aspherical surface which has a shape including portions having curvature that is progressively enhanced as the portions are farther away from the optical axis of the objective lens system; and (E) $0.2f < D_A < 8f$ wherein the reference symbol $D_A$ represents an optical path length as measured from the aperture stop to the aspherical surface disposed in said rear lens unit.

* * * * *